US011648922B2

(12) United States Patent
Liu

(10) Patent No.: US 11,648,922 B2
(45) Date of Patent: May 16, 2023

(54) MANUALLY-OPERATED, HEIGHT-ADJUSTABLE WHEELED VEHICLE, AND A BRAKE ASSEMBLY AND WHEEL FORK ASSEMBLY THEREOF

(71) Applicant: Evolution Technologies Inc., Port Coquitlam (CA)

(72) Inventor: Julian Liu, Port Moody (CA)

(73) Assignee: Evolution Technologies Inc., Port Coquitlam (CA)

( * ) Notice: Subject to any disclaimer, the term of this patent is extended or adjusted under 35 U.S.C. 154(b) by 82 days.

(21) Appl. No.: 16/738,423

(22) Filed: Jan. 9, 2020

(65) Prior Publication Data

US 2020/0146926 A1    May 14, 2020

Related U.S. Application Data

(63) Continuation-in-part of application No. 16/107,895, filed on Aug. 21, 2018, now Pat. No. 10,730,489, (Continued)

(51) Int. Cl.
*B60T 11/04* (2006.01)
*A61H 3/04* (2006.01)
(Continued)

(52) U.S. Cl.
CPC .......... *B60T 11/046* (2013.01); *A61G 1/0287* (2013.01); *A61G 5/1018* (2013.01);
(Continued)

(58) Field of Classification Search
CPC ....... B60T 11/046; B60T 1/04; A61G 1/0287; A61G 5/1018; A61H 2003/046
See application file for complete search history.

(56) References Cited

U.S. PATENT DOCUMENTS

| 188,835 A | 3/1877 | Allen |
| 291,351 A | 1/1884 | Jackson |

(Continued)

FOREIGN PATENT DOCUMENTS

| AT | 214095 B | 3/1961 |
| AT | 242315 B | 9/1965 |

(Continued)

OTHER PUBLICATIONS

"Pruefprotokoll/test protocol Rollatoren 07/05", signed on Oct. 30, 2007 (exhibit TT-25), Hannover, Germany.

(Continued)

*Primary Examiner* — Melanie Torres Williams
(74) *Attorney, Agent, or Firm* — Palmer IP Inc.

(57) ABSTRACT

A brake assembly for a manually-operated, height-adjustable wheeled vehicle according to a first aspect includes a brake cable assembly. The brake assembly includes a brake cable housing shaped to enclose an excess portion of the brake cable assembly. The brake assembly includes a cable adjuster coupled to the brake cable assembly. The cable adjuster is enclosed by the brake cable housing. There is additionally provided a wheel fork assembly for a manually-operated, height-adjustable wheeled vehicle according to a first aspect. The vehicle includes a frame member. The wheel fork assembly includes a mount shaped to couple with a lower end of the frame member of the vehicle. The mount has a longitudinal axis. The wheel fork assembly includes a wheel fork having a longitudinal axis offset from the longitudinal axis of the mount. The wheel fork is integrally coupled to and formed with the mount.

18 Claims, 22 Drawing Sheets

Related U.S. Application Data which is a continuation-in-part of application No. 14/966,572, filed on Dec. 11, 2015, now Pat. No. 10,053,062.

(60) Provisional application No. 62/908,091, filed on Sep. 30, 2019, provisional application No. 62/213,566, filed on Sep. 2, 2015.

(51) Int. Cl.
*B60T 1/04* (2006.01)
*A61G 1/02* (2006.01)
*A61G 5/10* (2006.01)
*F16C 1/22* (2006.01)
*F16D 125/62* (2012.01)

(52) U.S. Cl.
CPC .............. *A61H 3/04* (2013.01); *B60T 1/04* (2013.01); *F16C 1/22* (2013.01); *A61H 2003/046* (2013.01); *F16D 2125/62* (2013.01)

(56) References Cited

U.S. PATENT DOCUMENTS

| | | | |
|---|---|---|---|
| 522,117 A | 6/1894 | Humphrey | |
| 534,443 A | 2/1895 | Manguine | |
| 879,803 A | 2/1908 | Vlasak | |
| 1,767,925 A | 6/1930 | Hargreaves | |
| 2,169,860 A | 8/1939 | Hoorn | |
| 2,483,307 A | 9/1949 | Wheary, Jr. | |
| 2,631,655 A | 3/1953 | Jannello | |
| 2,656,881 A | 10/1953 | Hamilton | |
| 2,681,809 A | 6/1954 | Hamill | |
| 2,732,047 A | 1/1956 | Finkelstein | |
| 2,864,466 A | 12/1958 | Taylor | |
| 2,866,495 A | 12/1958 | Diehl et al. | |
| 2,937,248 A | 5/1960 | Michetti | |
| 2,987,149 A | 6/1961 | Finkelstein | |
| 3,018,506 A | 1/1962 | Haydock | |
| 3,142,351 A | 1/1962 | Green | |
| 3,061,049 A | 10/1962 | Bramley | |
| 3,109,899 A | 11/1963 | Pastene | |
| 3,194,577 A | 7/1965 | Berlin | |
| 3,268,965 A | 8/1966 | Arthur | |
| 3,288,250 A | 11/1966 | Oja et al. | |
| 3,376,400 A | 4/1968 | Batt et al. | |
| 3,387,681 A * | 6/1968 | Rabjohn | B60K 1/00 180/13 |
| 3,409,105 A | 11/1968 | Clinton | |
| 3,690,652 A | 9/1972 | Schneider | |
| 3,692,155 A | 9/1972 | Laurita | |
| 3,890,668 A | 6/1975 | Stosberg et al. | |
| 3,903,944 A | 9/1975 | Montgomery et al. | |
| 3,927,727 A | 12/1975 | Hanagan | |
| 3,969,964 A | 7/1976 | George et al. | |
| 4,029,279 A | 6/1977 | Nakatani | |
| 4,029,311 A | 6/1977 | Chanslor | |
| 4,056,115 A | 11/1977 | Thomas | |
| 4,087,141 A | 5/1978 | Roberts | |
| 4,116,464 A | 9/1978 | Haley | |
| 4,149,721 A | 4/1979 | Strickland | |
| 4,184,618 A | 1/1980 | Jones | |
| 4,185,936 A | 1/1980 | Takahashi | |
| 4,261,561 A | 4/1981 | Ilon | |
| 4,286,401 A | 9/1981 | Pachmayr et al. | |
| 4,325,561 A | 4/1982 | Lynn | |
| 4,371,183 A | 2/1983 | Dion | |
| 4,384,713 A | 5/1983 | Deutsch et al. | |
| 4,404,822 A | 9/1983 | Green | |
| 4,414,702 A | 11/1983 | Neumann | |
| 4,415,198 A | 11/1983 | Brearley | |
| 4,449,750 A | 5/1984 | Pultman | |
| 4,460,188 A | 7/1984 | Maloof | |
| 4,462,138 A | 7/1984 | Black | |
| 4,477,098 A | 10/1984 | Minnebraker | |
| 4,493,488 A | 1/1985 | Panaia et al. | |
| 4,494,271 A | 1/1985 | Perlin et al. | |
| 4,509,662 A | 4/1985 | Weiss | |
| 4,570,370 A | 2/1986 | Smith et al. | |
| 4,572,409 A | 2/1986 | Finnegan | |
| 4,596,484 A | 6/1986 | Nakatani | |
| 4,659,099 A | 4/1987 | Malone | |
| 4,669,146 A | 6/1987 | Saito et al. | |
| 4,676,416 A | 6/1987 | Harmon | |
| 4,694,706 A | 9/1987 | Lichtenberg | |
| 4,722,114 A | 2/1988 | Neumann | |
| 4,740,010 A | 4/1988 | Moskovitz | |
| 4,761,092 A | 8/1988 | Nakatani | |
| 4,765,644 A | 8/1988 | Bell | |
| 4,800,911 A | 1/1989 | Endres et al. | |
| 4,800,991 A | 1/1989 | Miller | |
| 4,830,035 A | 5/1989 | Liu | |
| 4,853,500 A | 8/1989 | Tydlacka | |
| 4,856,123 A | 8/1989 | Henderson et al. | |
| 4,883,317 A | 11/1989 | Davenport | |
| 4,890,355 A | 1/1990 | Schulten | |
| 4,907,794 A | 3/1990 | Rose | |
| 4,907,839 A | 3/1990 | Rose et al. | |
| 4,913,452 A | 4/1990 | Zun | |
| 4,930,697 A | 6/1990 | Takanashi et al. | |
| 4,962,781 A | 10/1990 | Kanbar | |
| 4,962,941 A * | 10/1990 | Rembos | A61G 5/061 180/8.2 |
| 4,974,760 A | 12/1990 | Miller | |
| 5,012,963 A | 5/1991 | Rosenbaum | |
| 5,020,560 A | 6/1991 | Turbeville | |
| 5,046,748 A | 9/1991 | Oat-Judge | |
| 5,052,075 A | 10/1991 | Harris | |
| 5,103,530 A | 4/1992 | Andrisin, III et al. | |
| 5,109,569 A | 5/1992 | Shaw | |
| 5,125,685 A | 6/1992 | Takahashi et al. | |
| 5,158,313 A | 10/1992 | Becker | |
| 5,167,048 A | 12/1992 | Geiger et al. | |
| 5,188,139 A | 2/1993 | Garelick | |
| 5,268,986 A | 12/1993 | Kakii | |
| 5,269,157 A | 12/1993 | Ciminelli et al. | |
| 5,279,180 A | 1/1994 | Henriksson | |
| 5,293,965 A | 3/1994 | Nagano | |
| 5,294,027 A | 3/1994 | Plastina | |
| 5,348,336 A | 9/1994 | Fernie et al. | |
| 5,353,824 A | 10/1994 | Woods et al. | |
| 5,356,237 A | 10/1994 | Sung | |
| 5,380,034 A | 1/1995 | Wilson | |
| 2,710,084 A | 6/1995 | Braverman | |
| 5,429,377 A | 7/1995 | Duer | |
| 5,433,235 A | 7/1995 | Miric et al. | |
| 5,465,745 A | 11/1995 | Davis | |
| 5,465,986 A | 11/1995 | Macrae | |
| 5,475,896 A | 12/1995 | Wang | |
| 5,482,189 A | 1/1996 | Dentler et al. | |
| 5,499,697 A | 3/1996 | Trimble et al. | |
| 5,513,789 A | 5/1996 | Woods et al. | |
| 5,527,096 A | 6/1996 | Shimer | |
| 5,531,238 A | 7/1996 | Azzarelli et al. | |
| 5,551,413 A | 9/1996 | Walk | |
| 5,593,461 A | 1/1997 | Reppert et al. | |
| 5,594,974 A | 1/1997 | Wattron et al. | |
| 5,605,345 A | 2/1997 | Erfurth et al. | |
| 5,621,997 A | 4/1997 | Pearce | |
| 5,622,404 A | 4/1997 | Menne | |
| 5,632,362 A | 5/1997 | Leitner | |
| 5,639,052 A | 6/1997 | Sauve | |
| 5,640,741 A | 6/1997 | Yano | |
| 5,662,342 A | 9/1997 | Basharat | |
| 5,687,984 A | 11/1997 | Samuel | |
| 5,692,762 A | 12/1997 | Obitts | |
| 5,722,717 A | 3/1998 | Rettenberger | |
| 5,772,234 A | 6/1998 | Luo | |
| 5,774,936 A | 7/1998 | Vetter | |
| 5,775,352 A | 7/1998 | Obitts | |
| 5,813,582 A | 9/1998 | Wright | |
| 5,816,650 A | 10/1998 | Lucas, Jr. | |
| 5,865,065 A | 2/1999 | Chiu | |
| 5,896,779 A | 4/1999 | Biersteker et al. | |

(56) References Cited

U.S. PATENT DOCUMENTS

| | | |
|---|---|---|
| 5,901,891 A | 5/1999 | Douglass |
| 5,915,712 A | 6/1999 | Stephenson et al. |
| 5,927,441 A | 7/1999 | Luo |
| 5,953,962 A | 9/1999 | Hewson |
| 5,954,161 A | 9/1999 | Lee |
| 6,032,765 A | 3/2000 | Hsi-Chia |
| 6,047,439 A | 4/2000 | Stearn |
| 6,079,290 A | 6/2000 | Li |
| 6,079,894 A | 6/2000 | Obitts |
| 6,082,468 A | 7/2000 | Pusateri et al. |
| 6,098,487 A | 8/2000 | Chien |
| 6,099,002 A | 8/2000 | Uchiyama |
| 6,112,446 A | 9/2000 | Forster et al. |
| 6,135,475 A | 10/2000 | Brown et al. |
| 6,142,526 A | 11/2000 | Katz |
| 6,161,896 A | 12/2000 | Johnson et al. |
| 6,164,154 A | 12/2000 | Munger et al. |
| 6,189,914 B1 | 2/2001 | Worth et al. |
| 6,192,772 B1 | 2/2001 | Huang |
| 6,196,562 B1 | 3/2001 | Zhuang |
| 6,202,502 B1 | 3/2001 | Chung-Che |
| 6,216,825 B1 | 4/2001 | Hung |
| 6,247,882 B1 | 6/2001 | Huang |
| 6,283,484 B1 | 9/2001 | Malmstrom |
| 6,296,261 B1 | 10/2001 | Degoma |
| 6,296,263 B1 | 10/2001 | Schultz et al. |
| 6,311,708 B1 | 11/2001 | Howle |
| 6,318,392 B1 | 11/2001 | Chen |
| 6,328,139 B1 * | 12/2001 | Yoshigai ............... B62M 25/02 188/24.11 |
| 6,338,355 B1 | 1/2002 | Cheng |
| 6,338,493 B1 | 1/2002 | Wohlgemuth et al. |
| 6,340,168 B1 | 1/2002 | Woleen |
| 6,347,777 B1 | 2/2002 | Webber et al. |
| 6,354,619 B1 | 3/2002 | Kim |
| 6,364,070 B1 | 4/2002 | Chen |
| 6,371,142 B1 | 4/2002 | Battiston |
| 6,378,663 B1 | 4/2002 | Lee |
| 6,378,883 B1 | 4/2002 | Epstein |
| 6,386,575 B1 | 5/2002 | Turner |
| 6,401,321 B2 | 6/2002 | Carey et al. |
| 6,409,196 B1 | 6/2002 | McFarland |
| 6,442,797 B1 | 9/2002 | Yang et al. |
| 6,467,785 B2 | 10/2002 | Toppses |
| 6,491,318 B1 | 12/2002 | Galt et al. |
| 6,494,469 B1 | 12/2002 | Hara |
| 6,502,280 B2 | 1/2003 | Looker |
| 6,527,136 B1 | 3/2003 | Sabounjian |
| 6,584,641 B1 | 7/2003 | Milbredt |
| 6,604,789 B1 | 8/2003 | Downing |
| 6,622,587 B1 | 9/2003 | Wu |
| 6,647,825 B1 | 11/2003 | Lin |
| 6,651,994 B2 | 11/2003 | Hallgrimsson et al. |
| 6,655,702 B2 | 12/2003 | Senger |
| 6,659,478 B2 | 12/2003 | Hallgrimsson |
| 6,688,633 B2 | 2/2004 | Van't Schip |
| 6,754,936 B2 | 6/2004 | Erenaga |
| 6,755,285 B1 | 6/2004 | Wu |
| 6,769,701 B1 | 8/2004 | Clausen |
| 6,810,560 B1 | 11/2004 | Tsai |
| 6,817,066 B1 | 11/2004 | Williams et al. |
| 6,837,503 B2 | 1/2005 | Chen et al. |
| D501,432 S | 2/2005 | Moller |
| 6,877,519 B2 | 4/2005 | Fink |
| 6,886,216 B2 | 5/2005 | Graham et al. |
| 6,886,575 B2 | 5/2005 | Diamond |
| 6,889,998 B2 | 5/2005 | Sterns et al. |
| 7,052,030 B2 | 5/2006 | Serhan |
| 7,090,239 B2 | 8/2006 | Yoshie et al. |
| 7,108,004 B2 | 9/2006 | Cowie et al. |
| 7,182,179 B2 | 2/2007 | Tolfsen |
| 7,211,744 B2 | 5/2007 | Jorgensen |
| 7,219,906 B2 | 5/2007 | Hallgrimsson et al. |
| 7,231,689 B2 | 6/2007 | Scheiber et al. |
| 7,278,436 B2 | 10/2007 | Gale et al. |
| 7,281,611 B2 * | 10/2007 | Tsai .................. B62L 1/02 188/24.12 |
| 7,290,742 B2 | 11/2007 | Wang |
| 7,306,246 B2 | 12/2007 | Gale |
| 7,353,566 B2 | 4/2008 | Scheiber et al. |
| 7,377,285 B2 | 5/2008 | Karasin et al. |
| 7,383,611 B2 | 6/2008 | Foster |
| 7,384,058 B2 | 6/2008 | Munsey et al. |
| 7,410,179 B2 | 8/2008 | Lonkvist |
| 7,422,550 B1 | 9/2008 | Pinero et al. |
| 7,445,216 B1 | 11/2008 | Chou |
| 7,494,138 B2 | 2/2009 | Graham |
| 7,500,689 B2 | 3/2009 | Pasternak et al. |
| 7,559,560 B2 | 7/2009 | Li et al. |
| 7,587,852 B1 | 9/2009 | Harms |
| 7,775,547 B2 | 8/2010 | Dotsey et al. |
| 7,828,305 B2 | 11/2010 | Meyers et al. |
| 7,837,205 B2 | 11/2010 | Simard |
| 7,841,257 B2 | 11/2010 | Tomandl |
| 7,926,834 B2 | 4/2011 | Willis |
| 7,980,415 B2 | 7/2011 | Crawley |
| 7,984,724 B1 | 7/2011 | Eberle |
| 8,002,363 B2 | 8/2011 | Cheng |
| 8,020,679 B2 | 9/2011 | Wu |
| 8,083,239 B2 | 12/2011 | Liu |
| 8,087,127 B2 | 1/2012 | Dayt |
| 8,157,273 B2 | 4/2012 | Bar-Lev |
| 8,167,351 B2 | 5/2012 | Plowman |
| 8,251,380 B2 | 8/2012 | Liu |
| 8,251,391 B2 | 8/2012 | Kohler et al. |
| 8,313,066 B2 | 11/2012 | Hampton et al. |
| 8,424,215 B2 | 4/2013 | Quintiliani et al. |
| 8,434,171 B2 | 5/2013 | Wang |
| 8,448,960 B2 | 5/2013 | Liu |
| 8,505,936 B2 | 8/2013 | Liu |
| 8,511,694 B2 | 8/2013 | Bradshaw et al. |
| 8,517,399 B2 | 8/2013 | Liu |
| 8,573,613 B2 | 11/2013 | Liu |
| 8,602,424 B2 | 12/2013 | Liu |
| D697,163 S | 1/2014 | Bietsch |
| 8,801,073 B1 | 8/2014 | Gray, Jr. et al. |
| 8,857,093 B2 | 10/2014 | Hogue |
| 8,864,151 B1 | 10/2014 | Liu |
| 8,936,256 B2 | 1/2015 | Liu |
| 9,022,397 B1 | 5/2015 | Prettyman |
| 9,022,413 B2 | 5/2015 | Liu |
| 9,221,433 B2 | 12/2015 | Dunlap |
| 9,315,173 B1 * | 4/2016 | Gray ............... B60T 7/06 |
| 9,339,432 B2 | 5/2016 | Liu et al. |
| 9,500,831 B2 * | 11/2016 | Haataja ............... G02B 6/4453 |
| 10,053,062 B2 | 8/2018 | Liu |
| 2002/0050697 A1 | 5/2002 | Hallgrimsson |
| 2002/0079663 A1 | 6/2002 | Hallgrimsson et al. |
| 2002/0093178 A1 | 7/2002 | Turner et al. |
| 2002/0140196 A1 | 10/2002 | Crouch et al. |
| 2003/0010368 A1 | 1/2003 | Mackinnon |
| 2003/0226584 A1 | 12/2003 | Serhan |
| 2004/0094999 A1 | 5/2004 | Volotsenko |
| 2004/0111830 A1 | 6/2004 | Cooper et al. |
| 2005/0001398 A1 | 1/2005 | Serhan |
| 2005/0057021 A1 | 3/2005 | Miyoshi |
| 2005/0067804 A1 | 3/2005 | Tolfsen |
| 2005/0121481 A1 | 6/2005 | Chiu |
| 2005/0156395 A1 | 7/2005 | Bohn |
| 2005/0156404 A1 | 7/2005 | Lauren et al. |
| 2005/0211285 A1 | 9/2005 | Cowie et al. |
| 2005/0250605 A1 | 11/2005 | Moore et al. |
| 2006/0059656 A1 | 3/2006 | Hackett |
| 2006/0156511 A1 | 7/2006 | Li |
| 2007/0170699 A1 | 7/2007 | Li et al. |
| 2007/0199586 A1 | 8/2007 | Cheng |
| 2007/0227570 A1 | 10/2007 | Gale et al. |
| 2007/0235067 A1 | 10/2007 | Gale et al. |
| 2007/0267054 A1 | 11/2007 | Meyers et al. |
| 2007/0267453 A1 | 11/2007 | Carroll |
| 2007/0278271 A1 | 12/2007 | Koren |
| 2007/0278768 A1 | 12/2007 | Lynam |
| 2007/0283990 A1 | 12/2007 | Fernandez et al. |
| 2008/0042476 A1 | 2/2008 | Hei et al. |

(56) References Cited

U.S. PATENT DOCUMENTS

| | | | |
|---|---|---|---|
| 2008/0079230 A1 | 4/2008 | Graham | |
| 2008/0111349 A1 | 5/2008 | Willis | |
| 2008/0121258 A1 | 5/2008 | Lin | |
| 2008/0129016 A1 | 6/2008 | Willis | |
| 2008/0174084 A1 | 7/2008 | Gee | |
| 2008/0302201 A1 | 12/2008 | Tomandl | |
| 2009/0033052 A1 | 2/2009 | Bradshaw et al. | |
| 2009/0165208 A1 | 7/2009 | Reed | |
| 2009/0206578 A1 | 8/2009 | Pizmony et al. | |
| 2010/0083994 A1 | 4/2010 | Liu | |
| 2010/0301574 A1 | 12/2010 | Derks | |
| 2011/0030749 A1 | 2/2011 | Miller | |
| 2011/0146027 A1 | 6/2011 | Tsai | |
| 2011/0173861 A1 | 7/2011 | Roth | |
| 2011/0187067 A1 | 8/2011 | Staggs | |
| 2011/0241303 A1 | 10/2011 | Campbell | |
| 2012/0043739 A1 | 2/2012 | Lui | |
| 2012/0084940 A1 | 4/2012 | Tsai | |
| 2012/0104710 A1 | 5/2012 | Liu | |
| 2012/0133106 A1 | 5/2012 | Liu | |
| 2012/0205882 A1 | 8/2012 | Staggs | |
| 2012/0280463 A1 | 11/2012 | Liu | |
| 2012/0299272 A1 | 11/2012 | Liu | |
| 2013/0062864 A1 | 3/2013 | Huang | |
| 2013/0168947 A1 | 7/2013 | Offord | |
| 2013/0187356 A1 | 7/2013 | Hazeleger | |
| 2013/0264787 A1 | 10/2013 | Cheng et al. | |
| 2013/0320640 A1 | 12/2013 | Liu | |
| 2014/0125037 A1 | 5/2014 | Andersen | |
| 2014/0175841 A1 | 6/2014 | Liu | |
| 2014/0284891 A1 | 9/2014 | Liu | |
| 2014/0305249 A1 | 10/2014 | Liu | |
| 2014/0312586 A1 | 10/2014 | Cheng et al. | |
| 2014/0333040 A1 | 11/2014 | Liu | |
| 2015/0048582 A1 | 2/2015 | Liu | |
| 2015/0320633 A1* | 11/2015 | Jacobs | A61H 3/04 297/6 |
| 2017/0057473 A1 | 3/2017 | Liu | |
| 2019/0009758 A1 | 1/2019 | Liu | |

FOREIGN PATENT DOCUMENTS

| | | | |
|---|---|---|---|
| CA | 2137650 A1 | 6/1995 | |
| CA | 2285305 A1 | 10/1998 | |
| CA | 2352801 A1 | 6/2000 | |
| CA | 2329485 A1 | 6/2002 | |
| CA | 2513558 A1 | 9/2004 | |
| CA | 2492392 A1 | 9/2005 | |
| CN | 202163565 U | 12/1993 | |
| CN | 2551232 Y | 5/2003 | |
| CN | 202163565 U | 3/2012 | |
| CN | 202490148 U | 10/2012 | |
| CN | 203544058 U | 4/2014 | |
| DE | 4328875 C1 | 2/1995 | |
| DE | 19615567 A1 * | 11/1996 | A61G 7/1019 |
| DE | 19636587 C1 * | 1/1998 | A61G 5/1035 |
| DE | 29818710 U1 | 9/1999 | |
| DE | 202004010326 U1 | 11/2004 | |
| DE | 102010031954 A1 | 1/2012 | |
| DE | 202011003227 U1 | 2/2012 | |
| DE | 102013217906 B3 | 12/2014 | |
| EP | 1092411 A2 | 4/2001 | |
| EP | 2090276 A1 | 8/2009 | |
| EP | 2522404 A1 | 11/2012 | |
| EP | 2821046 A2 * | 1/2015 | A61G 5/1089 |
| EP | 3012472 A1 | 4/2016 | |
| GB | 191223483 A | 5/1913 | |
| GB | 365901 A | 1/1932 | |
| GB | 984025 A | 2/1965 | |
| GB | 1396227 A | 6/1975 | |
| GB | 2180508 A | 4/1987 | |
| JP | H05303018 A | 11/1993 | |
| JP | H09123915 A | 5/1997 | |
| JP | H10291401 A | 11/1998 | |
| NL | 1022512 C1 | 8/2004 | |
| WO | WO1992006661 A1 | 4/1992 | |
| WO | WO1998051557 A1 | 11/1998 | |
| WO | WO2002022070 A2 | 3/2002 | |
| WO | 2004073578 A1 | 9/2004 | |
| WO | WO2004073578 A1 | 9/2004 | |
| WO | 2006112779 A1 | 10/2006 | |
| WO | WO2006112779 A1 | 10/2006 | |
| WO | WO2008019454 A1 | 2/2008 | |

OTHER PUBLICATIONS

Showing the words "Jazz Sales Brochure" besides a listing "May 1, 2008", which allegedly eventually links to "Dolomite Jazz Operating Instructions" shown in exhibit TT-7(http://doclibrary.invacare.fr/Office/Europe/Marketing/MktDocIE.nsf/VALLMDocument/BCCFF695FBFFA571C12575BA0056AB70/$File/OPERATING%20INSTRUCTIONS%20JAZZ.pdf).

A web printout screen shot of http://doclibrary.invacare.fr/Office/Europe/Marketing/MktDocIE.nsf/MListeProduct?openform&bu=3000&subgroup=3300&family=3410 (exhibit TT-5).

A web printout screen shot of http://doclibrary.invacare.fr/Office/Europe/Marketing/MktDocCor.nsf/MListeDocument?openform&bu=3000&subgroup=3300&family=3410&product=65_JAZ showing the words "TUV Certificate 2007—Jazz" (exhibit T-23).

A web printout screen shot of http://web.archive.org/web/20080214151414/http://www.dolomite.biz/ (exhibit TT-32) dated Feb. 14, 2008.

A web printout screen shot of http://web.archive.org/web/20080512005035/http://www.handicat.com/at-num-18827.html (exhibits TT-16, 17) dated May 12, 2008.

A web printout screen shot of http://web.archive.org/web/20080512005035/http://www.handicat.com/at-num-18827.html (translated) (exhibit TT-18) dated May 12, 2008.

A web printout screen shot of http://web.archive.org/web/20080608193327/http://www.dolomite.biz/dolomite/products.php (exhibit TT-33) dated Feb. 14, 2008.

A web printout screen shot of http://web.archive.org/web/20080919040758/http://www.dolomite.biz/dolomite/dolomite-jazz.php (exhibit TT-34) dated Feb. 14, 2008.

A web screen shot printout from doclibrary.invacare.fr . . . (?) dated Aug. 6, 2013, in which adjacent to the heading "Dolomite Jazz", a "Jazz Sales Brochure" is listed as having a "start date of validity" of May 1, 2008, and in which a "Jazz spare parts list" is listed as having a "start date of validity" of May 1, 2008.

A web screen shot printout of: web.archive.org/web/20080508194602/http://www.dolomite.biz/, dated May 8, 2008.

Caster, http://en.wikipedia.org/wiki/Caster, dated Oct. 20, 2010.

International Search Report and Written Opinion for PCT/CA2015/050058, dated May 1, 2015.

Merriam-Webster Dictionary, Arch—Definition and More from the Free Merriam-Webster Dictionary, dated Mar. 26, 2013.

Thelma Thibodeau, "Affidavit of Thelma Thibodeau", signed on Nov. 20, 2012, 113 pages, Montreal, Canada, listing the following.

Two web screen shot printouts from handicat.com/classif4-num-03-09-06.html, dated Aug. 6, 2013, in which adjacent to a "Dolomite Jazz" heading, the words "Crée le . . . May 7, 2008—Modifiée: Jul. 24, 2013", which may mean "Created on May 7, 2008—Modified: May 24, 2013".

Two web screen shot printouts from doclibrary.invacare.fr . . . (?) dated Aug. 6, 2013, in which adjacent to a "Dolomite Jazz" heading, "2007" is set out by a "TUV certificate".

International Search Report and Written Opinion for PCT/CA2016/050978, dated Oct. 17, 2016.

International Search Report and Written Opinion for PCT/CA2016/051017, dated Oct. 26, 2016.

International Search Report and Written Opinion for PCT/CA2016/050371, dated Jun. 9, 2016.

* cited by examiner

MANUALLY-OPERATED, HEIGHT-ADJUSTABLE WHEELED VEHICLE, AND A BRAKE ASSEMBLY AND WHEEL FORK ASSEMBLY THEREOF

CROSS REFERENCE TO RELATED APPLICATIONS AND CLAIM TO PRIORITY

This application is a continuation-in-part of U.S. patent application Ser. No. 16/107,895, filed Aug. 21, 2018, which is a continuation-in-part of U.S. patent application Ser. No. 14/966,572, filed Dec. 11, 2015, now U.S. Pat. No. 10,053,062, based on provisional application Ser. No. 62/213,566 filed Sep. 2, 2015, and is also based upon U.S. Provisional Application No. 62/908,091, filed Sep. 30, 2019, the disclosures of which are incorporated herein by reference and to which priority is claimed.

FIELD OF THE INVENTION

The present invention relates to a manually-operated, height-adjustable wheeled vehicle. In particular, the invention relates to a manually-operated, height-adjustable wheeled vehicle, such as a walker, a rollator, a transport chair, a wheelchair, a wheeled commode, an evacuation chair, or height-adjustable stretcher, and a brake assembly and wheel fork assembly thereof.

DESCRIPTION OF THE RELATED ART

U.S. Pat. No. 10,053,062 to Lui discloses a brake assembly for a height-adjustable walker apparatus. The brake assembly includes a brake actuator, a wheel-engaging brake member and a brake cable assembly. The brake cable assembly includes a flexible, inner cable, and a flexible, outer casing through which the inner cable extends and is moveable relative thereto. The inner cable has a first end coupled to the brake actuator and a second end coupled to the wheel-engaging brake member. The brake assembly includes a brake cable housing shaped to enclose a slack portion of the brake cable assembly.

U.S. Pat. No. 4,962,781 to Kanbar discloses a collapsible rolling cane adapted to assist an elderly or handicapped person in walking. The cane includes a front leg having a handle attached to its upper end at a height convenient to the user, with a single front wheel being mounted on the lower end. A shorter tubular rear leg is pivotally connected at its upper end to the leaf of a first hinge joined to the front leg at a position below the upper end thereof. The lower end of the rear leg is joined to the midpoint of a transverse axle on either end of which a rear wheel is mounted. Bridging the legs is a foldable arm, one end of which is pivotally connected to the leaf of a second hinge joined to the front leg at a position above its lower end, the other end of the arm being pivotally connected through a longitudinal slot in the rear leg to a slide therein, whereby when the cane is collapsed to put it in an inactive state, the slide rides up the rear leg to fold the arm and position the front and rear legs in parallel relation, and when the cane is put in an active state, the slide rides down the rear leg to extend the arm and cause the front and rear legs to assume an acute angle and the front and rear wheels then engage the ground at the points of a triangle to render the rolling cane stable.

BRIEF SUMMARY OF INVENTION

The present invention provides, and it is an object to provide, an improved manually-operated, height-adjustable wheeled vehicle, and brake assembly and wheel fork assembly thereof.

There is provided a brake assembly for a manually-operated, height-adjustable wheeled vehicle according to a first aspect. The brake assembly includes a brake cable assembly. The brake assembly includes a brake cable housing shaped to enclose an excess portion of the brake cable assembly. The brake assembly includes a cable adjuster coupled to the brake cable assembly. The cable adjuster is enclosed by the brake cable housing.

There is also provided a brake assembly for a manually-operated, height-adjustable wheeled vehicle according to a second aspect. The vehicle includes a height-adjustable assembly. The brake assembly includes a brake cable housing coupled to and extending laterally outwards from the height-adjustable assembly. The brake cable housing encloses a chamber and has an opening in communication with the chamber. The brake assembly includes a brake cable assembly. The brake cable assembly includes a first portion extending along the height-adjustable assembly. The brake cable assembly includes a second portion enclosed within the brake cable housing. The second portion of the brake cable assembly extends into the chamber via said opening and is movable anywhere within said chamber.

There is further provided a brake assembly for a manually-operated, height-adjustable wheeled vehicle according to a third aspect. The vehicle includes a height-adjustable assembly. The brake assembly includes a brake cable assembly extending along the height-adjustable assembly. The brake assembly includes a brake cable housing shaped to enclose an excess portion of the brake cable assembly within a chamber thereof. The brake cable housing has an access port extending through an inner side planar portion thereof. The access port being in communication with the chamber.

There is additionally provided a wheel fork assembly for a manually-operated, height-adjustable wheeled vehicle according to a first aspect. The vehicle includes a frame member. The wheel fork assembly includes a mount shaped to couple with a lower end of the frame member of the vehicle. The mount has a longitudinal axis. The wheel fork assembly includes a wheel fork having a longitudinal axis offset from the longitudinal axis of the mount. The wheel fork is integrally coupled to and formed with the mount.

There is yet further provided a wheel fork assembly for a manually-operated, height-adjustable wheeled vehicle according to a second aspect. The vehicle includes a frame member. The wheel fork assembly includes a mount. An upper portion of the mount is shaped to couple with a lower end of the frame member of the vehicle. A lower portion of the mount curves laterally outwards. The wheel fork assembly includes a wheel fork coupled to the lower portion of the mount.

There is yet also provided a wheel fork assembly for a manually-operated, height-adjustable wheeled vehicle according to a third aspect. The wheel fork assembly includes a pair of elongate supports. The supports have lower portions between which a wheel is mountable. The supports have upper portions. An aperture extends through the upper portion of one said support. The wheel fork assembly includes an upper cover which couples together the upper portions of the supports. The wheel fork assembly includes a side cover that extends across the aperture and which is selectively removable.

There is yet additionally provided a wheel fork assembly for a manually-operated, height-adjustable wheeled vehicle according to a fourth aspect. The vehicle includes a wheel-engaging brake member and a brake adjustment mechanism. The wheel fork assembly includes a pair of elongate supports between which a wheel is received and to which the wheel rotatably couples. The wheel fork assembly includes a housing which couples together the supports and extends about the wheel-engaging brake member and the brake adjustment mechanism. The housing includes a side cover. Removal of the side cover thereof provides access to the brake adjustment mechanism. The side cover aligns with one of the elongate supports.

There is also provided a wheel fork assembly for a manually-operated, height-adjustable wheeled vehicle according to a fifth aspect. The vehicle includes a wheel-engaging brake member and a brake adjustment mechanism. The wheel fork assembly includes a pair of elongate supports between which a wheel is received and to which the wheel rotatably couples. The wheel fork assembly includes a housing which couples together the supports. The housing extends about the wheel-engaging brake member and the brake adjustment mechanism. The housing includes a cover. Removal of the cover provides access to the brake adjustment mechanism. The cover aligns with an inner side of the wheel fork assembly.

There is further provided a walker comprising one of the preceding brake assemblies and/or wheel fork assemblies. There is also provided a rollator comprising one of the preceding brake assemblies and/or wheel fork assemblies. There is additionally provided a transport chair comprising one of the preceding brake assemblies and/or wheel fork assemblies. There is yet further provided a combination transport chair and walker comprising one of the preceding brake assemblies and/or wheel fork assemblies. There is yet also provided a wheelchair comprising one of the preceding brake assemblies and/or wheel fork assemblies. There is yet additionally provided a wheeled commode comprising one of the preceding brake assemblies and/or wheel fork assemblies. There is also provided an evacuation chair comprising one of the preceding brake assemblies and/or wheel fork assemblies. There is further provided a height-adjustable stretcher comprising one of the preceding brake assemblies and/or wheel fork assemblies.

There is yet further provided a manually-operated, height-adjustable wheeled vehicle. The vehicle includes a height-adjustable assembly having a longitudinal axis. The vehicle includes a side frame member coupled to the height-adjustable assembly. The side frame member extends outwards from the height-adjustable assembly relative to the longitudinal axis of the height-adjustable assembly. The vehicle includes a brake cable having an elongate portion and an excess portion; and a brake cable housing axially offset from the height-adjustable assembly, the brake cable housing enclosing the excess portion of the brake cable at least in part, and the brake cable housing coupling to the side frame member.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED
EMBODIMENT(S)

Figure 1:
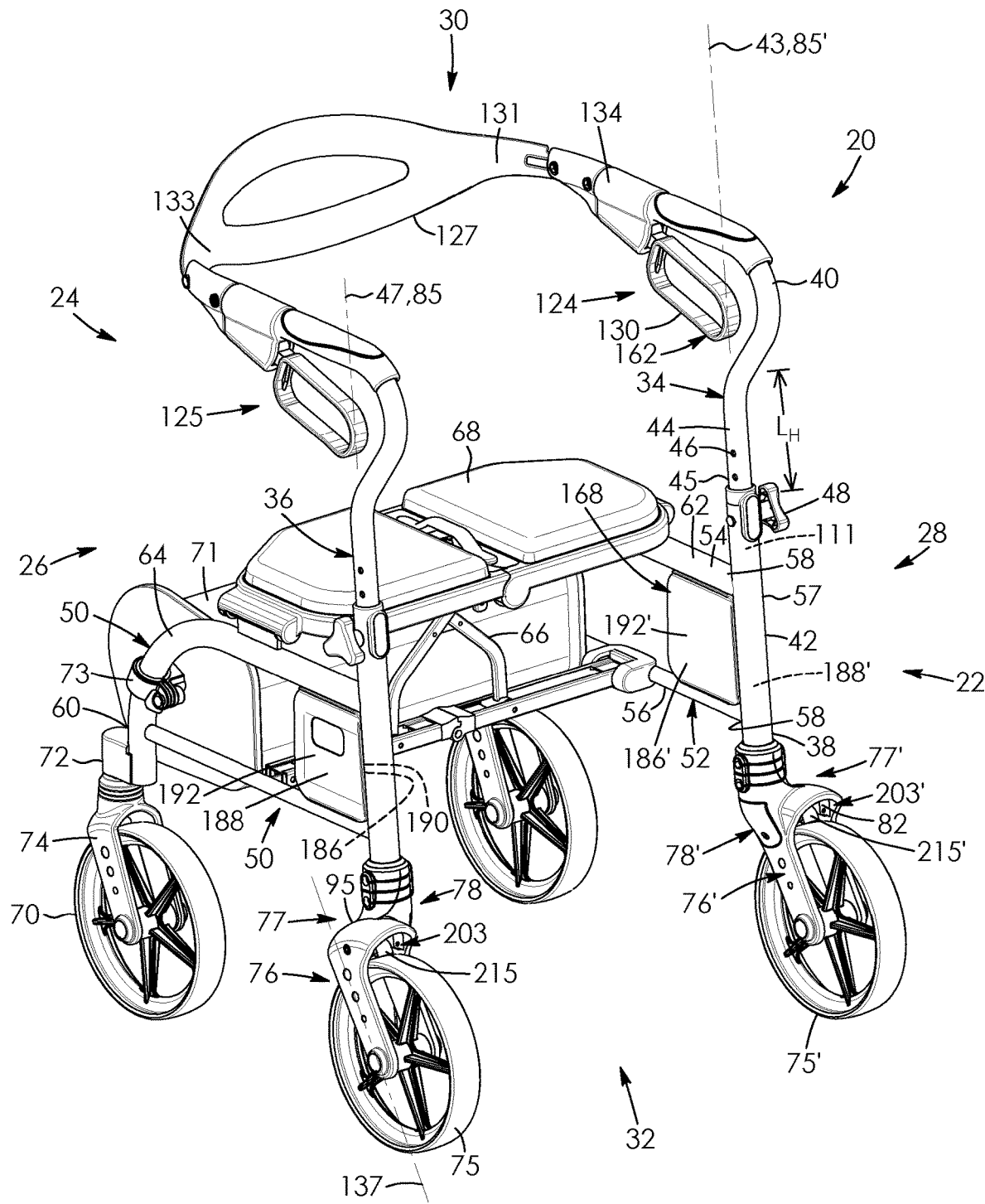
FIG. 1 is a rear, right side, top perspective of a manually-operated, height-adjustable wheeled vehicle according to a first aspect, the vehicle comprising a walker apparatus that includes a folding mechanism, a seat assembly, a height-adjustable assembly shown in an extended position and a brake assembly, the brake assembly including a pair of brake cable housings coupled to the height-adjustable assembly.

Referring to the drawings and first to FIG. 1, there is shown a manually-operated, height-adjustable wheeled vehicle. The vehicle may also be referred to as a transport apparatus or a travel-assistance apparatus and in this example comprises a height-adjustable walker apparatus 20. The walker apparatus may be referred to as a walker or rollator. The walker apparatus 20 has a rear 22 and a front 24. The walker apparatus has a pair of spaced-apart sides 26 and 28, a top 30 and a bottom 32 which is spaced-apart from the top. The rear 22 and front 24 of the walker apparatus 20 extend between the sides 26 and 28 thereof and the top 30 and bottom 32 thereof. The top and bottom of the walker apparatus also extend between the sides 26 and 28 thereof.

Still referring to FIG. 1, the walker apparatus 20 includes a pair of spaced-apart, upright, height/length-adjustable assemblies 34 and 36 aligning with respective ones of the sides 26 and 28 thereof. Each of the assemblies has a lower end and an upper end, as seen by lower end 38 and upper end 40 for assembly 34. Each of the assemblies is telescopic and height-adjustable, with a lower outer elongate member or tube, and an upper inner elongate member or tube shaped to fit within the lower tube. This is seen by outer tube 42 and inner tube 44 for assembly 34. The assemblies 34 and 36 have longitudinal axes 43 and 47. Portions 57 of outer tubes 42 and telescoping portions 45 of inner tubes 44 extend along respective said axes.

Figure 3:
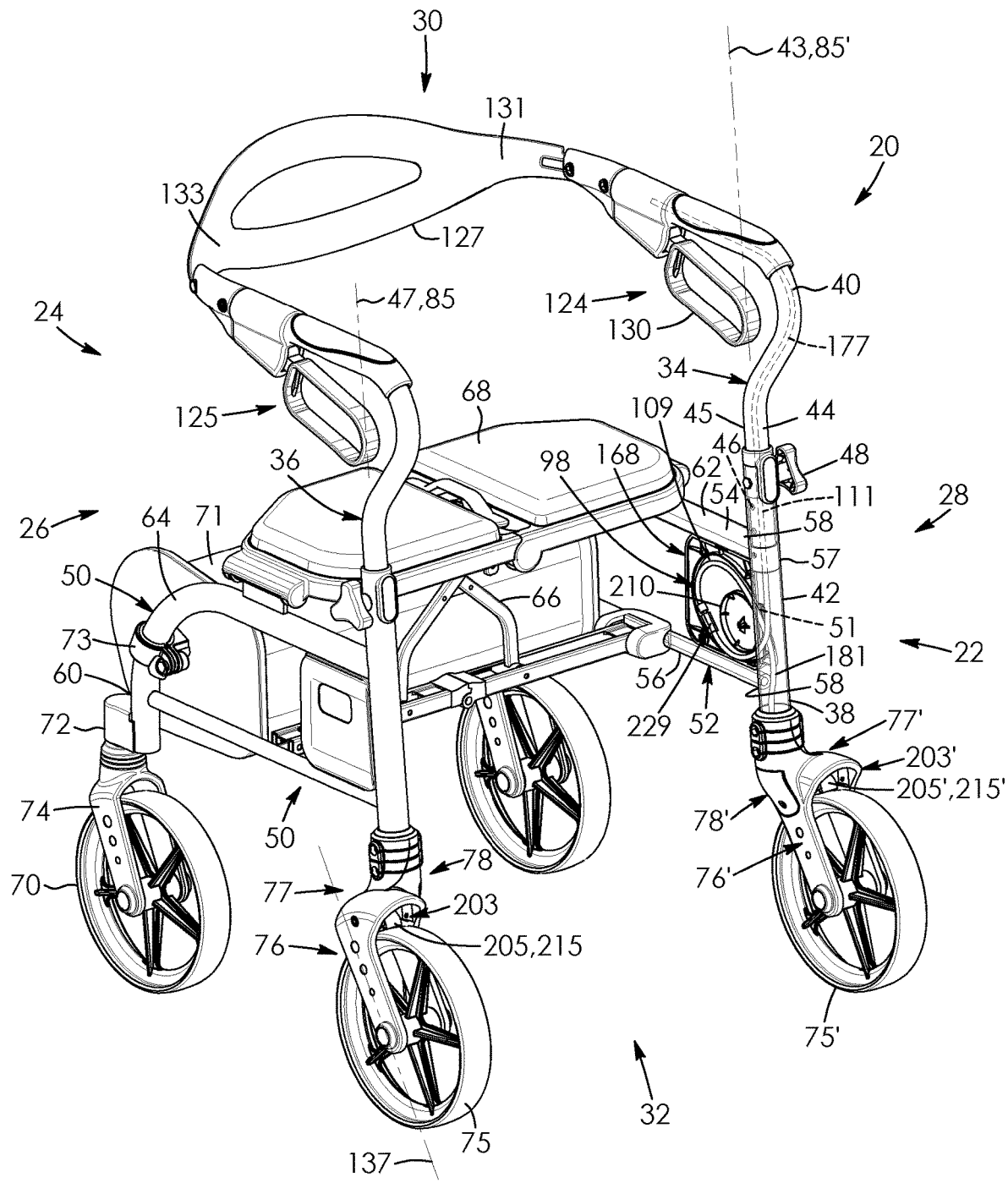
FIG. 3 is a rear, right side, top perspective of the walker apparatus of FIG. 2, with the height-adjustable assembly being shown in a retracted position.

Each of the inner tubes 44 has a plurality of longitudinally spaced-apart apertures 46 which provide a length LH of adjustment range. The walker apparatus 20 includes a pair of coupling mechanisms for selectively coupling the pairs of telescoping tubes 42 and 44 together, in this example in the form of thumb screws 48. The thumb screws are threadably coupled to the outer tubes 42 in this example. Selective rotation of the thumb screws causes the thumb screws to be selectively inserted through one of said apertures 46 of the inner tube 44 to fixedly adjust the height of the telescoping tubes. This enables the height of the walker apparatus to be adjusted to provide an optimized handlebar height for the user. The height of the walker apparatus is thus adjustable from a retracted position of the tubes 42 and 44 seen in FIG. 3 to an extended position of the tubes seen in FIG. 1 as well as positions therebetween.

Figure 4:
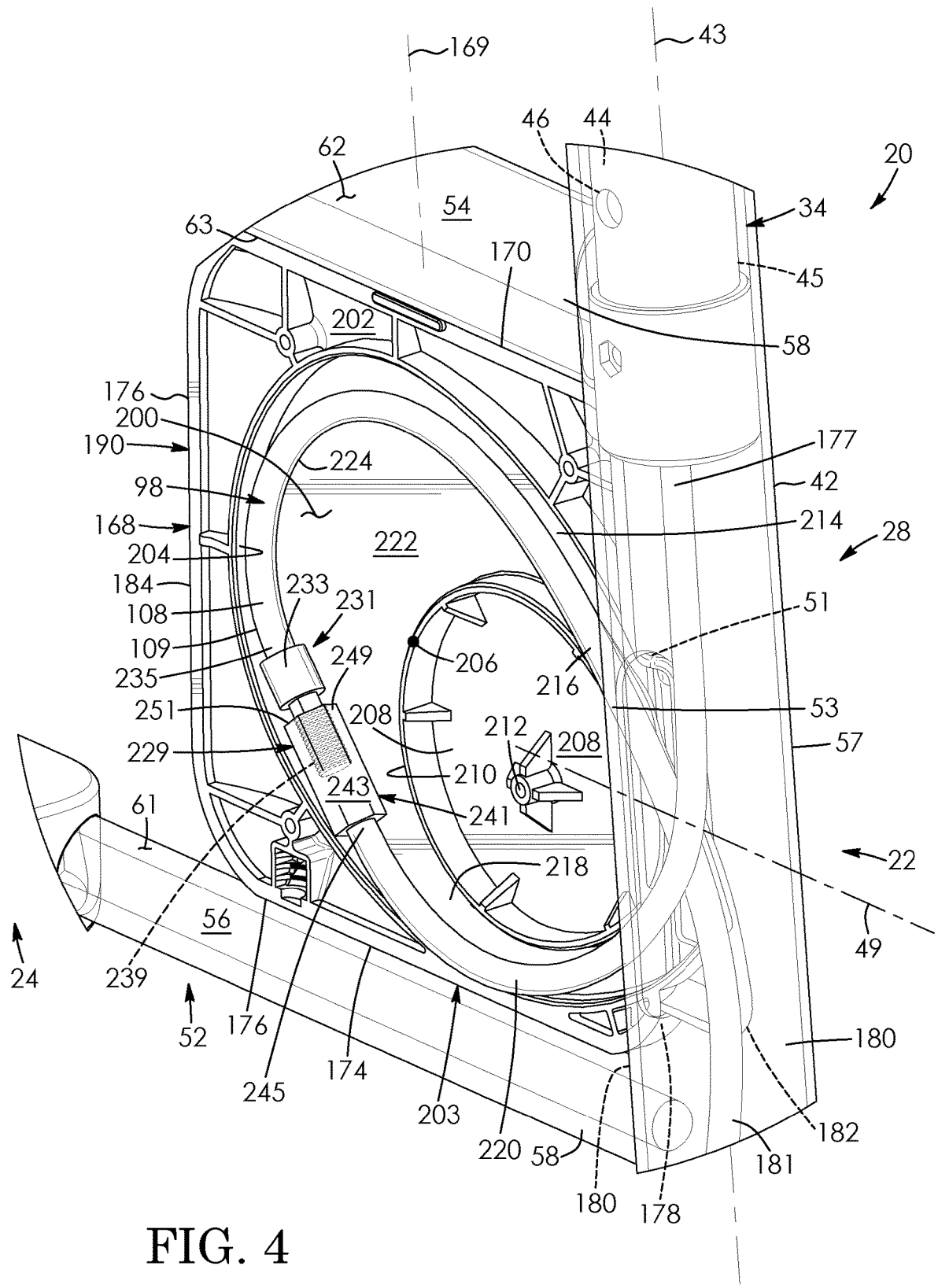
FIG. 4 is an enlarged, inner side perspective view of the partially unassembled brake cable housing of FIG. 3 revealing a slack portion of the brake cable assembly enclosed therewithin, the brake assembly including a cable adjuster shown in a retracted position, with the rest of the walker apparatus being shown in fragment and with transparent shading to reveal the interior components thereof.

As seen in FIG. 4, each of the outer tubes 42 of the height-adjustable assemblies 34 has an aperture 51 extending therein. Each aperture extends about a lateral axis 49 that is perpendicular to the longitudinal axis 43 of its corresponding assembly 34. Each aperture 51 is slot shaped and obround in this example; however this is not strictly required. Each aperture faces the front 24 of the walker apparatus 20 in this example and extends through a front portion 180 of the tube 42. Each aperture 51 is interposed between the lower end 38 and upper end 40 of its height-adjustable assembly 34 seen in FIG. 1. Each aperture is adjacent to and spaced-apart upwards from the corresponding end 38 of its height-adjustable assembly seen in FIG. 1.

Still referring to FIG. 1, the walker apparatus 20 includes a pair of spaced-apart laterally-extending assemblies 50 and 52. The laterally-extending assemblies align with respective ones of the sides 26 and 28 of the walker apparatus and extend from near the bottom 32 towards the top 30 thereof. Each of the laterally-extending assemblies includes a pair of spaced-apart, elongate upper and lower side members, or side frame members, with the upper members being in the form of tubes 54 in this example and the lower members being the form of tubes 56 in this example. Each tube has a proximal end 58 coupled to corresponding outer tube 42 and a distal end 60 spaced-apart from its proximal end. Tubes 56 thus couple to and extend radially outwards from tubes 42 and height-adjustable assemblies 34 and 36. Each tube 56 extends laterally-outwards and perpendicular from its corresponding outer tube 42 towards the front 24 of the walker apparatus 20, in this example. As seen in FIG. 4, each tube has a longitudinally-extending top 61 which faces corresponding tube 54 of its laterally-extending assembly 50. The tops of the tubes are curved at least in part in lateral cross-section and outwardly convex in lateral cross-section in this example.

Still referring to FIG. 4, each tube 54 includes a substantially-straight portion 62 in this example which is coupled to and extends laterally-outwards from corresponding outer tube 42 towards the front 24 of the walker apparatus 20. Aperture 51 of tube 42 is interposed and extends between tube 56 and substantially-straight portion 62 of tube 54 and is positioned adjacent to tube 56 in this example. Each straight portion 62 of the tubes 54 has a longitudinally-extending bottom 63 which face the top 61 of its corresponding tube 56. The bottoms of the straight portions of the tubes 54 are curved at least in part in lateral cross-section and outwardly convex in lateral cross-section in this example. As seen in FIG. 1, each tube includes a curved portion 64 in this example which couples to and is interposed between the straight portion thereof and distal end 60 of its corresponding tube 56.

Still referring to FIG. 1, the walker apparatus includes folding mechanism 66 in this example coupled to and extending between the laterally-extending assemblies 50 and 52. The folding mechanism is configured to enable the walker apparatus 20 to selectively fold laterally. The walker apparatus includes a seat assembly 68 which extends between and pivotally couples to the straight portions 62 of tubes 54 of the laterally-extending assemblies 50 and 52 in this example. The walker apparatus 20 includes a foldable basket 71 adjacent to the front 24 thereof and which couples to and extends between laterally-extending assemblies 50 and 52 thereof via connectors 73. The various parts and functionings of the folding mechanism 66, seat assembly 68 and foldable basket are described in more detail in U.S. Pat. No. 8,083,239 and United States Patent Application Publication No. 2019/0009758 A1, the disclosures of which are incorporated herein by reference.

As seen in FIG. 1, the walker apparatus 20 includes a first or front pair of ground-engageable wheels 70 operatively coupled to and pivotable relative to the distal ends 72 of the curved portions 64 of tubes 54 by way of front wheel forks 74. The walker apparatus includes a second or rear pair of ground-engageable wheels 75 and 75' operatively coupled to and rotatable relative to the lower ends 38 and 38' of the height-adjustable assemblies via wheel fork assemblies 76 and 76'. In this example the wheel fork assemblies are rear wheel fork assemblies. Like parts have like numbers and functionings with the addition of extension'. The wheel fork assemblies 76 and 76' have outer sides 77 and 77' which align with sides 26 and 28 of the walker apparatus 20. The wheel fork assemblies have inner sides 78 and 78' which are inwardly facing and which face each other.

Figure 8:
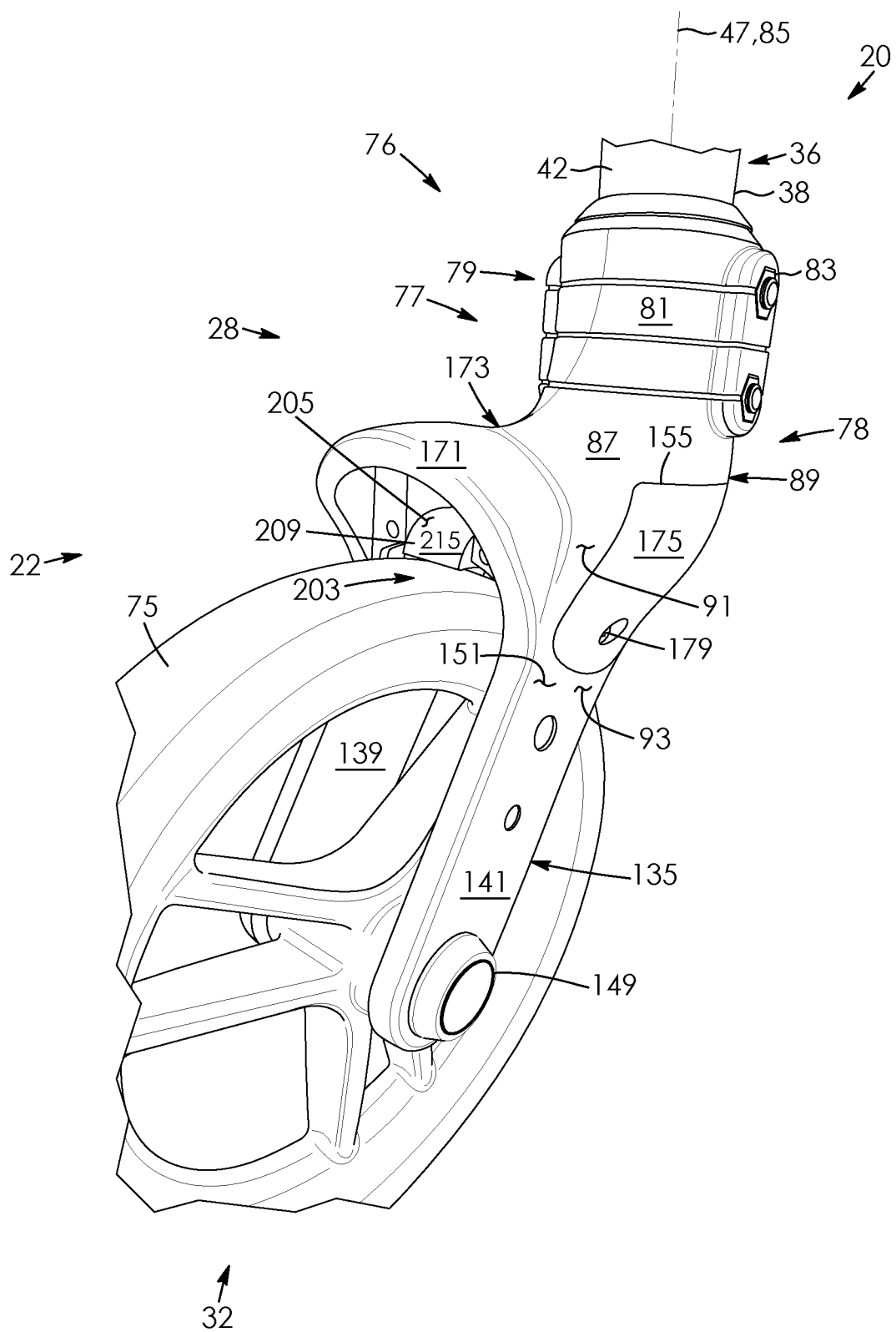
FIG. 8 is a rear, inner side perspective view of the rear wheel fork assembly of FIG. 7, the rear wheel fork assembly including a side cover, and with the wheel and height-adjustable assembly of FIG. 7 being shown in fragment.

As seen in FIG. 8, each wheel fork assembly 76 includes a mount 79 having an upper portion 81 which is tubular in this example. The upper portion of the mount is shaped to receive the lower end 38 of its corresponding tube 42 and couple thereto via fasteners, in this example screws 83. The upper portion 81 of the mount 79 has a longitudinal axis 85 which is coaxial with the longitudinal axis 47 of the corresponding height-adjustable assembly 36 of the walker apparatus 20.

Figure 7:
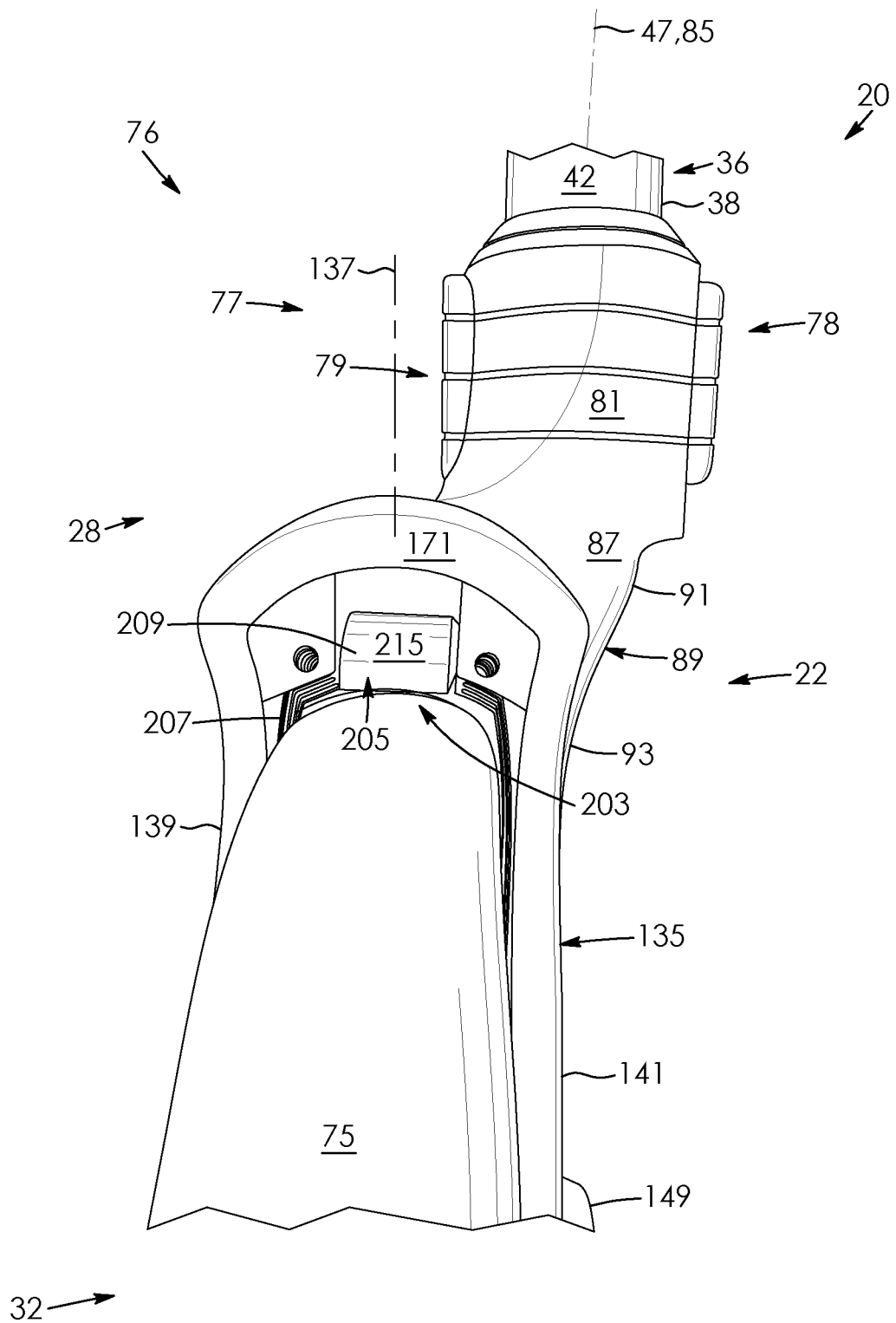
FIG. 7 is a rear elevation view of a rear, right side wheel fork assembly of the walker apparatus of FIG. 1, with a wheel of the walker apparatus and one of the height-adjustable assembly of the walker apparatus being shown in fragment.
Figure 11:
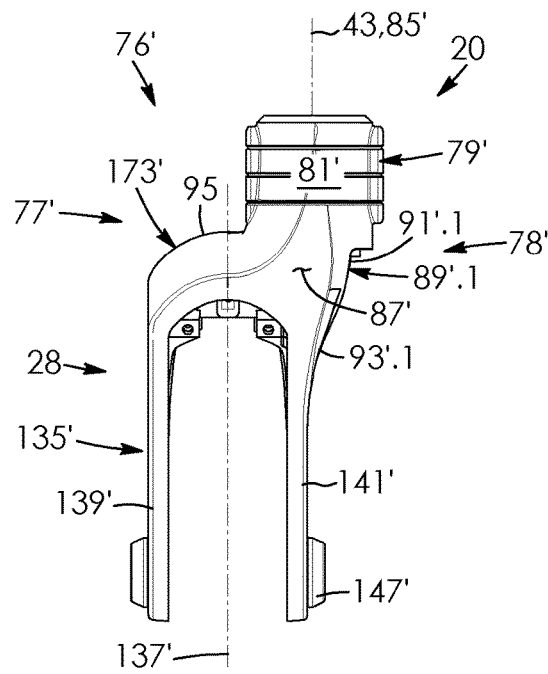
FIG. 11 is a front elevation view of the rear, left side wheel fork assembly of FIG. 10, with the brake and brake adjustment mechanism thereof being removed and not shown.

As seen in FIG. 7, each mount 79 includes a lower portion 87 that couples to and is integrally formed with the upper portion 81 thereof. The lower portion of the mount extends laterally outwards relative to the axis 85 of the upper portion of the mount and axis 47 of the corresponding height-adjustable assembly 36, from the upper portion of the mount towards the bottom 32 and corresponding side 28 of the walker apparatus 20. The lower portion 87 of the mount 79 has an inner surface 89 which extends along the inner side 78 of the wheel fork assembly 76 in this example. The inner surface of the lower portion of the mount has an upper region 91 which is outwardly convex. The inner surface 89 of the lower portion 87 of the mount 79 has a lower region 93 adjacent to wheel 75 and which is outwardly concave in this example. The inner sides 78 of the wheel fork assemblies are thus outwardly concave in part and outwardly convex in part in this example. The outer sides of the lower portion of the mount are outwardly convex in this example, as seen by outer side 95' in FIG. 11.

Referring to FIG. 8, each wheel fork assembly 76 includes a wheel fork 135. The wheel fork couples to the lower portion 87 of the mount 79 and in this example is integrally coupled to and formed with the mount. As seen in FIG. 7, each wheel fork 135 mount has a longitudinal axis 137 that is laterally offset from the longitudinal axis 85 of its corresponding mount 79.

Figure 9:
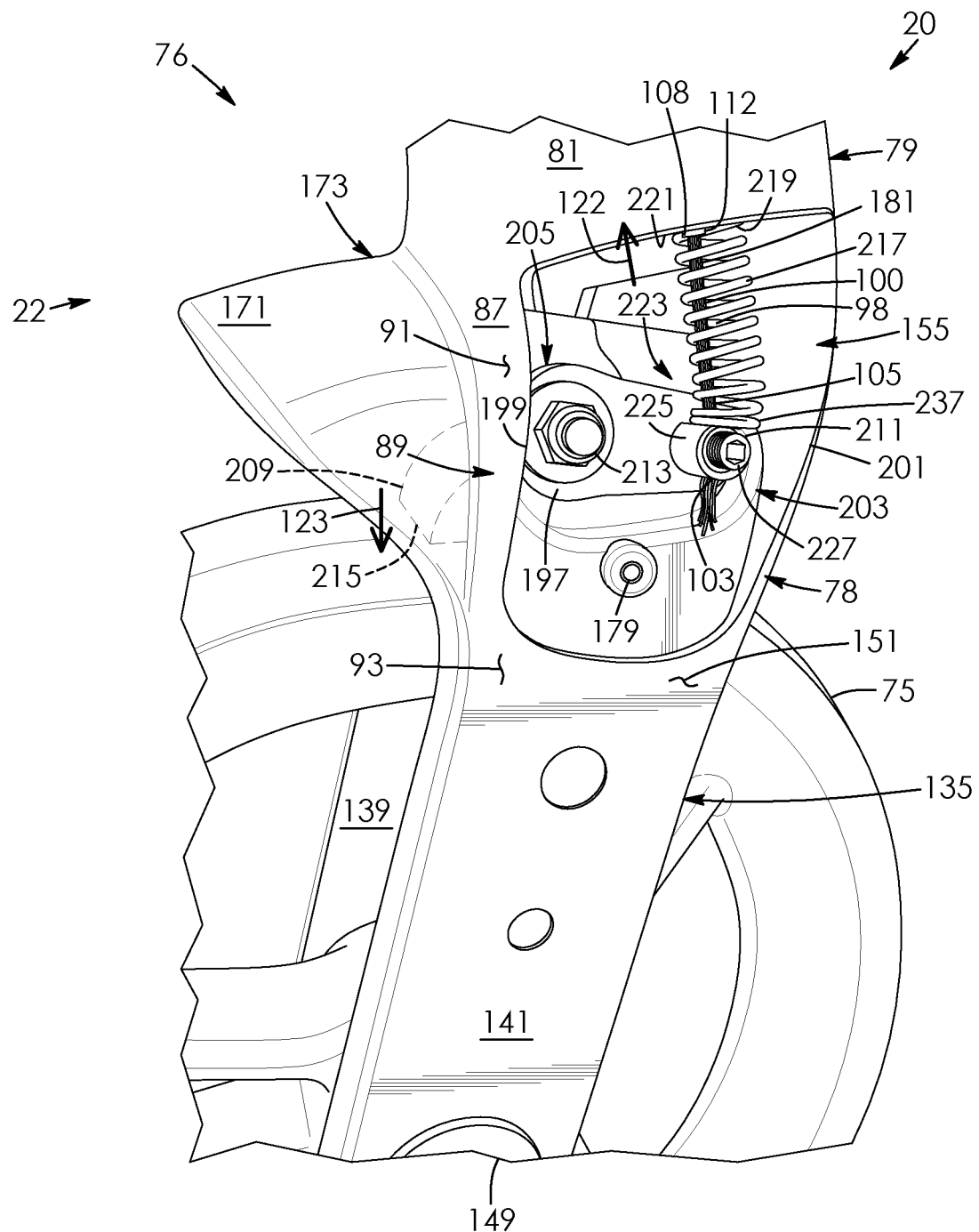
FIG. 9 is an inner side elevation view of the rear wheel fork assembly of FIG. 8, with the side cover thereof being removed to reveal a brake adjustment mechanism of the brake assembly of the walker apparatus, and with the wheel and rear wheel fork assembly of FIG. 8 being shown in fragment.
Figure 10:
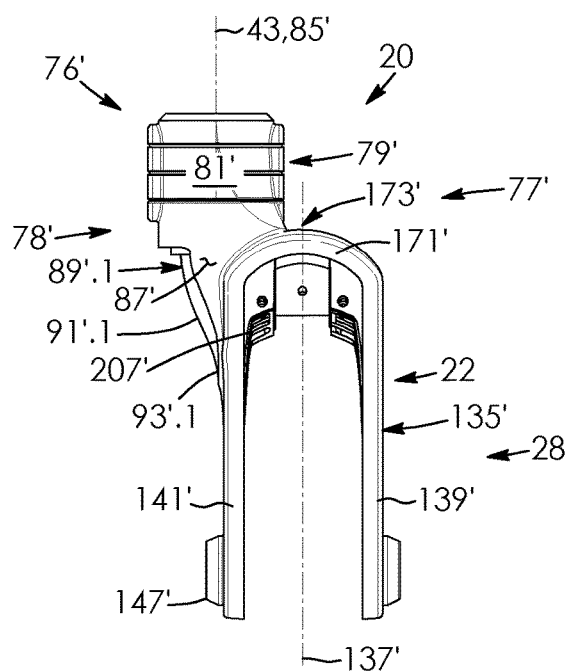
FIG. 10 is a rear elevation view of a rear, left side wheel fork assembly of the walker apparatus of FIG. 1, with a brake and brake adjustment mechanism thereof being removed and not shown.
Figure 12:
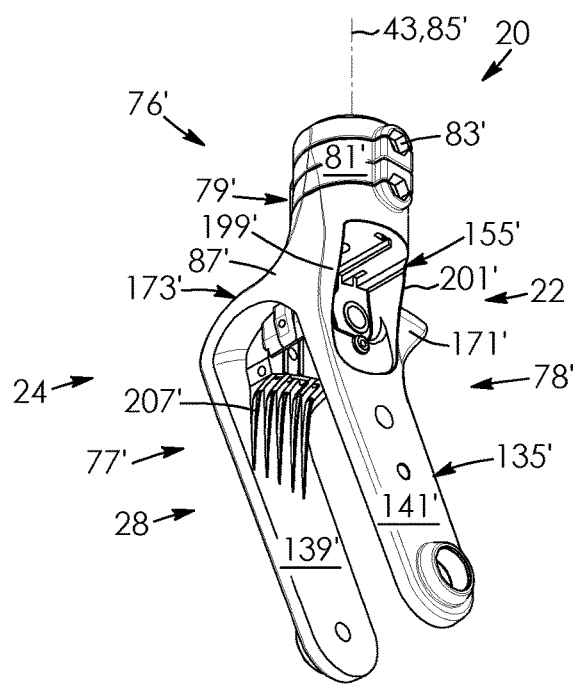
FIG. 12 is a front, inner side, bottom perspective view of the rear, left side wheel fork assembly of FIG. 10, with a side cover thereof, the brake and the brake adjustment mechanism thereof being removed and not shown.
Figure 13:
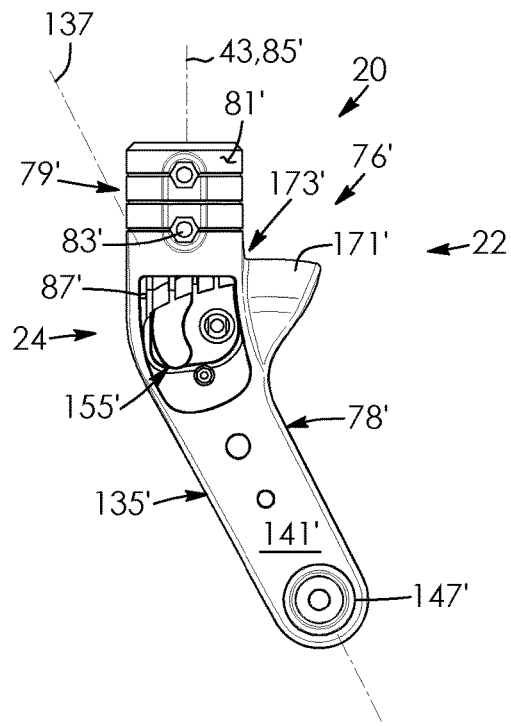
FIG. 13 is an inner side elevation view of the rear, left side wheel fork assembly of FIG. 10, with the side cover, the brake and the brake adjustment mechanism thereof being removed and not shown.

Referring back to FIG. 8, the wheel fork includes a pair of elongate inner and outer supports 139 and 141 with lower portions 149 between which wheel 75 is received and to which the wheel rotatably couples. Each of the elongate supports is planar in shape in this example and may be referred to a planar portion of the wheel fork. As seen in FIG. 7, the wheel fork 135 is shaped to receive the wheel 75 therebetween such the wheel is forward facing and laterally outwardly spaced from tube 42. As seen in FIG. 10, inner support 141' aligns with the longitudinal axis 85' of mount 79' and longitudinal axis 85' of assembly 34 seen in FIG. 1 in this example. Referring to FIG. 9, each of the inner elongate supports 141 has an upper portion 151 with an aperture 155 extending therethrough. As seen in FIG. 12, each of the supports includes a plurality of strengthening ribs 207' coupled thereto. The ribs of the two supports 139' and 141' face each other and are positioned between the supports.

Referring to FIG. 8, each wheel fork 135 includes an upper cover 171 which couples together the upper portions 151 of the supports 139 and 141. The upper cover is arc-shaped in this example. The upper cover 171 and upper portions 151 of the supports 139 and 141 form a wheel fork housing 173. The wheel fork housing includes a side cover 175 that extends over aperture 155. As seen in FIG. 12, the wheel fork housing 173' includes a pair of outwardly extending flanges 199' and 201' between which the aperture 155' extends and between which the side cover extends. As seen in FIG. 8, the side cover 175 is outwardly-curved and in this example is outwardly-convex. The side cover aligns with the upper portion 151 of the inner support 141 of its corresponding wheel fork 135 and extends along the inner side 78 of the wheel fork assembly 76 in this example. The wheel fork assembly includes a fastener, in this example screw 179 via which the side cover 175 couples to the inner support. The side cover is thus selectively removable.

Figure 2:
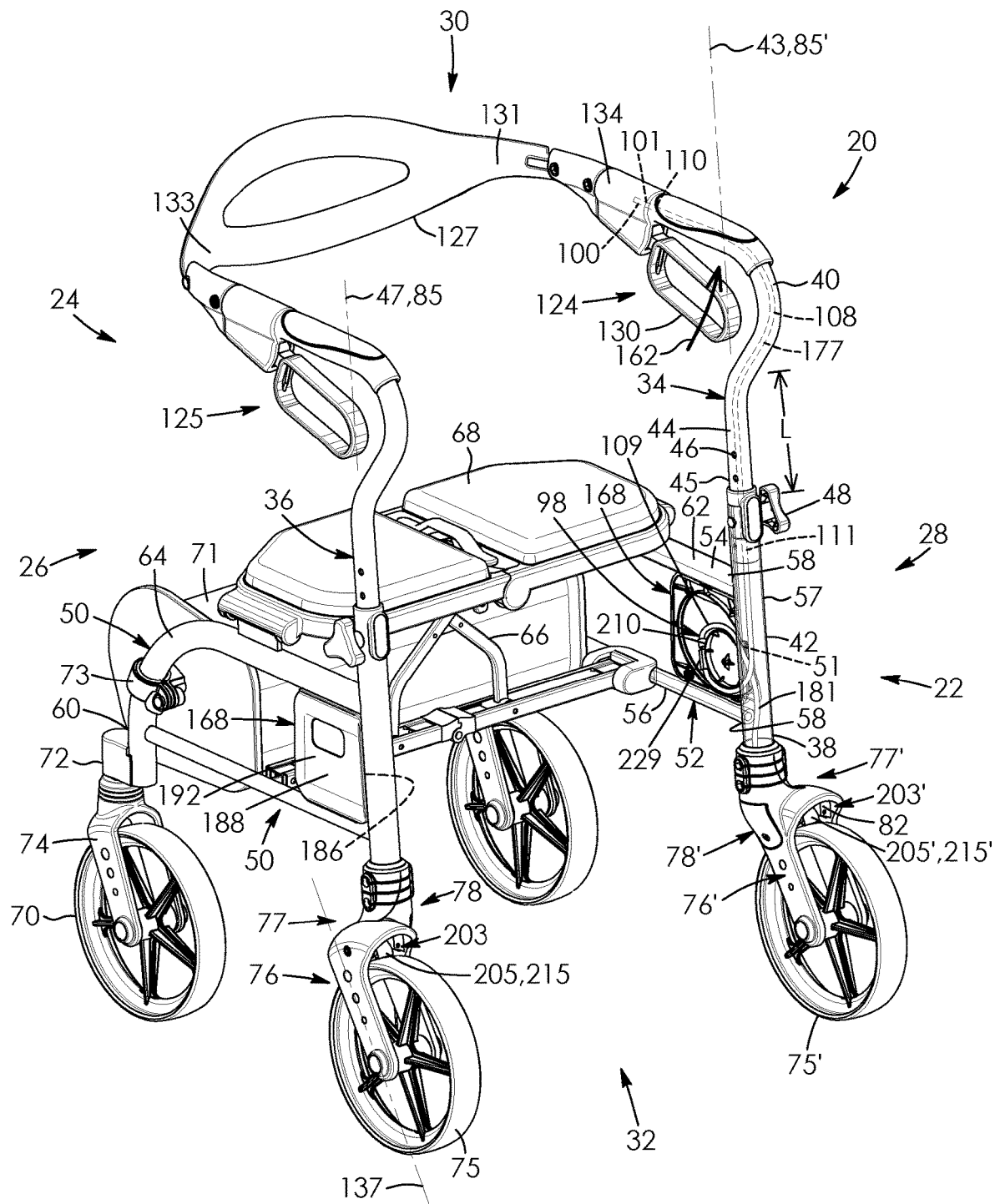
FIG. 2 is a rear, right side, top perspective of the walker apparatus of FIG. 1, with one of the brake cable housings being shown partially unassembled to reveal interior components thereof, and the brake assembly including a pair of brake cable assemblies one of which is shown partially in ghost.

As seen in FIG. 2, the walker apparatus 20 includes a pair of brake assemblies 203 and 203' for its rear wheels 75 and 75'. Each brake assembly includes a wheel-engaging brake member 205. As seen in FIG. 9, each brake member has a first end 209 and a second end 211 spaced-apart from the first end. In this example each brake member 205 pivotally connects to its respective wheel fork 135 via bearing 197 which is interposed between the first and second ends of the brake member. The bearing rotatably mounts to and pivots about shaft 213 coupled to the wheel fork. Each brake member 205 includes a brake pad 215 in this example coupled to and extending downwards from the first end 209 thereof. Each brake pad faces its corresponding wheel 75.

Each brake member 205 includes in this example a resilient member in the form of a coil spring 217. The coil spring has an upper end 219 which abuts upper wall 221 of the wheel fork 135 in this example. The coil spring 217 has a lower end 237 which abuts end 211 of the brake member 205. The coil spring is configured to spring-bias the brake pad 215 away and, in this example, upwards from wheel 75.

Still referring to FIG. 9, each brake assembly 203 includes a brake adjustment mechanism 223. The brake adjustment mechanism in this example includes a sleeve 225 coupled to the end 211 of the brake member 205. The lower end 237 of the coil spring 217 abuts the sleeve. The brake adjustment mechanism 223 includes a set screw 227 threadably coupled to the sleeve 225. Housing 173 is shaped to extend about the brake member 205 and brake adjustment mechanism 223. Aperture 155 is in fluid communication with the brake adjustment mechanism. Selective removable of the side cover 175, seen in FIG. 8, provides access to the brake adjustment mechanism 223 seen in FIG. 9.

Referring to FIG. 2, each brake assembly 203 further includes a brake cable assembly 98, in this example in the form of Bowden-type brake cable assembly. As seen in FIG. 9, the brake cable assembly includes a flexible, inner cable 100 made of metal in this example. Referring to FIG. 2, the cable has an upper or first end 101. As seen in FIG. 9, each cable 100 has a lower or second end 103. The second end of the cable 100 is operatively coupled to the second end 211 of brake member 205, in this example via portion 105 of the cable extending through sleeve 225, with set screw 227 thereafter being tightened to engage with said portion 105. The set screw enables the tension of cable 100 to be adjusted by lowering or elevating end 103 of the cable and thereafter securing the cable in place via the set screw.

As seen in FIG. 2, each brake cable assembly 98 has a first, and in this example, generally straight and elongate portion 111 which extends along the height-adjustable assembly 34. In this example the elongate portion of the brake cable assembly is primarily enclosed within its corresponding height-adjustable assembly 34. However this is not strictly required; for example, the elongate portion 111 of the brake cable assembly 98 may extend along the outside of the height-adjustable assembly in other embodiments. The elongate portion of the brake cable assembly extends generally parallel with longitudinal axis 43 where the elongate portion enters within outer tube 42 and the telescoping portion 45 of the inner tube 44.

Figure 5:
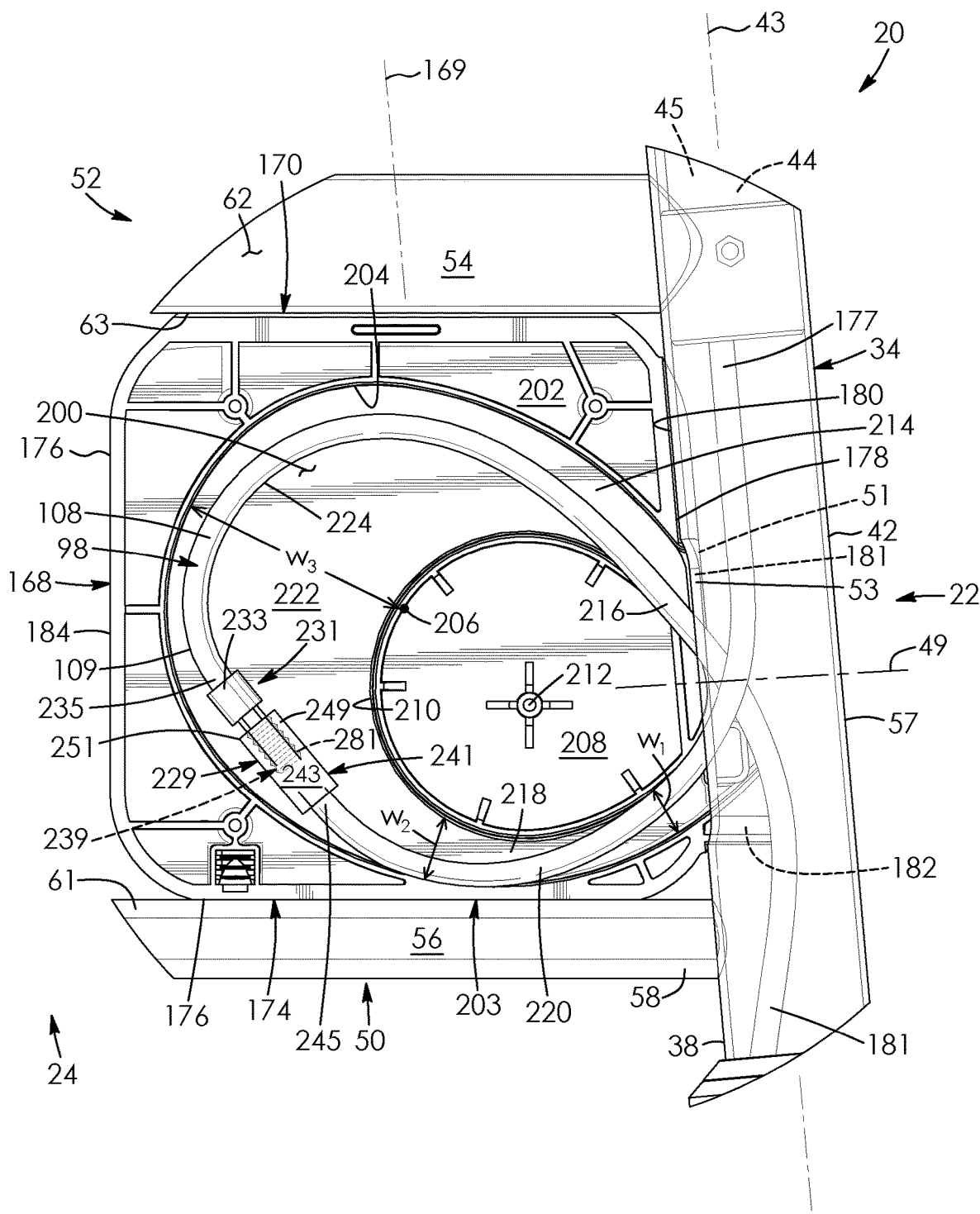
FIG. 5 is an inner side elevation view of the brake cable housing of FIG. 4, with the cable adjuster shown in its retracted position, and the rest of the walker apparatus being shown in fragment and with transparent shading to reveal the interior components thereof.

As seen in FIG. 4, each cable has a second or excess portion, in this example a slack portion 109 that is loop-shaped. The slack portion is thus a coiled section of the brake cable assembly comprising, and in this example consisting of, a single loop. The slack portion 109 of the brake cable assembly extends through the aperture 51 of tube 42. As seen in FIG. 5, the slack portion of the brake cable assembly 98 extends laterally outwards relative to longitudinal axis 43 from assembly 34 and generally in the direction lateral axis 49.

Each brake cable assembly 98 includes a flexible outer casing or cable sleeve 108 through which cable 100, seen in FIG. 9, extends and is moveable relative thereto. The cable sleeve may be referred to as a cable sleeve and is made of plastic in this example. The cable sleeve 108 has a first end 110 seen in FIG. 2 and a second end 112 seen in FIG. 9. Second end 112 of the cable sleeve couples to wheel fork 135 via a mount 79 through which cable 100 extends. Upward movement of cable 100, as shown by arrow of numeral 122, causes end 211 of brake member 205 to more upwards relative to FIG. 9. This in turn causes end 209 and brake pad 215 of the brake member to move downwards, as shown by arrow of numeral 123, for selectively engaging the pad against the wheel 75 and braking the wheel. Thus, each brake member 205 operatively connects to the lower end 38 of its height-adjustable assembly 34 seen in FIG. 2. The brake member as herein described is one example of a braking system for apparatus 20, and the brake assembly 203 may use other braking systems for the brake cable assembly 98 in other embodiments.

As seen in FIG. 2, the walker apparatus 20 includes a pair of handle bar assemblies 124 and 125 coupled to the upper ends 40 of respective ones of the height-adjustable assemblies 34 and 36. The walker apparatus includes an arcuate-shaped backrest 127 positioned along the front 24 thereof. The backrest is in the shape of a flexible strap in this example and extends between the handle bar assemblies 124 and 125. The backrest 127 couples to the handle bar assemblies via spaced-apart ends 131 and 133 of the backrest.

Still referring to FIG. 2, each of the handle bar assemblies includes a brake actuator, in this example in the form of a gripping handle 130 pivotally mounted to a respective handle bar housing 134. First end 101 of cable 100 operatively couples to the gripping handle. Upward movement of the gripping handles 130, as shown by arrow of numeral 162, causes the cable of the brake cable assembly 98 to be actuated, pulled and moved relative to casing 108 of the brake cable assembly for selectively actuating brake member 205 seen in FIG. 9. Gripping handles and brake actuators for brake assemblies are known per se and more details in this regard are disclosed, for example, in U.S. Pat. No. 8,083,239, the disclosure of which is incorporated herein by reference.

As seen in FIG. 1, the walker apparatus 20 includes a pair of hollow, brake cable housings corresponding to respective ones of the height-adjustable assemblies, as seen by brake cable housing 168 for height-adjustable assembly 34. Referring to FIG. 2, each brake cable housing is shaped to enclose the slack portion 109 of its corresponding brake cable assembly 98. Each brake cable housing 168 is generally rectangular in the shape in this example in side, top, bottom, rear and front profile.

As best seen in FIG. 4, each brake cable housing has an elongate top 170 shaped to align with and receive the bottom 63 of the substantially-straight portion 62 of tube 54 in this example. Each brake cable housing 168 has an elongate bottom 174 opposite its top 170. The bottom of the brake cable housing is shaped to align with, extend along in part and receive the top 61 of tube 56 in this example. Each brake cable housing 168 further includes an elongate rear 178 which extends between the top 170 and bottom 174 thereof. The rear of the brake cable housing extends along and is shaped to abut and receive a front portion 180 of tube 42 of its corresponding height-adjustable assembly 34 extending between tubes 54 and 56 in this example. However, this manner and location of connection is not strictly required and instead of directly connecting, the brake cable housing may merely operatively connect to the height-adjustable assembly 34 in other embodiments. As seen in FIG. 5, brake cable housing 168 thus couples to and has a longitudinal axis 169 axially offset from the tubes 42 and 44 of assembly 34. The brake cable housing thus couples to and extends laterally outwards from the assembly 34 in this example.

As seen in FIG. 4, each brake cable housing 168 includes a hollow protrusion 182 which extends outwards from rear 178 thereof. The protrusion is shaped to fit within tube 42 via aperture 51. Portions 53 of tube 42 extending around aperture 51 are configured to snugly abut with the protrusion in this example. Each brake cable housing 168 has a front 184 spaced-apart from the rear 178 thereof. The front of the brake cable housing extends between the top 170 and bottom 174 thereof. The front 184 of the brake cable housing 168 is substantially vertically-extending and straight in this example.

Referring to FIG. 1, the brake cable housings include a pair of spaced-apart side planar portions, in this example inner side planar portions, in this case inner sides 186 and 186', and exterior side planar portions, in this case outer sides 188 and 188'. The outer sides extend along sides 26 and 28 of the walker apparatus 20. The outer sides 188 and 188' face opposite from the inner sides 186 and 186'. The inner and outer sides of the brake cable housings 168 are substantially planar and rectangular in this example. Each side extends between the top 170, bottom 174, rear 178 and front 184 of the brake cable housing seen in FIG. 4. Still referring to FIG. 4, the brake cable housing 168 includes a peripheral portion 176 which extends along the top 170, front 184, bottom 174 and rear 178 thereof. The peripheral portion extends about the inner side 186 and outer side 188 thereof seen in FIG. 2.

As seen in FIG. 4, each brake cable housing 168 includes a first part 190 which extends between top 170, bottom 174, rear 178 and front 184 thereof and which extends from its inner side towards its outer side. As seen in FIG. 2, each brake cable housing 168 includes a second part 192 that is complementary to, selectively connectable to and selectively removable from part 190. Parts 190 and 192 are respective halves of the brake cable housing in this example though this is not strictly required. Part 192 extends between the top, bottom, rear and front of the brake cable housing, and extends from the outer side towards the inner side of the brake cable housing.

As seen in FIG. 4, each brake cable housing 168 has an interior or interior space 200 that is generally crescent-shaped in this example. Each brake cable housing has an outer portion 202 which extends along the top 170, bottom 174, rear 178, and front 184 thereof. The outer portion 202 of the brake cable housing has an inner wall or peripheral edge 204 which encloses the interior space 200 thereof along with the sides of the brake cable housing. The inner peripheral edge of the outer portion is inwardly concave and is generally arc-shaped, in this case tear-drop shaped in this example. The peripheral edge 204 seen in FIG. 4 extends between the sides 186 and 188 of the brake cable housing seen in FIG. 1. Referring back to FIG. 4, the outer portion 202 of the brake cable housing has a central axis 206 in this example.

Each brake cable housing 168 includes an inner portion 208 positioned within the interior space 200 thereof. The inner portion of the brake cable housing includes an inner wall or outer peripheral edge 210 which is outwardly convex and arc-shaped in this example. The outer peripheral edge extends between the sides 186 and 188 of the brake cable housing 168 seen in FIG. 1. Referring back to FIG. 4, the inner portion 208 of the brake cable housing 168 has a central axis 212 which is axially offset from the central axis 206 of the outer portion 202 of the brake cable housing.

Still referring to FIG. 4, the brake cable housing 168 receives and in this example encloses the slack portion 109 of brake cable assembly 98 within interior space 200 thereof. The brake cable housing includes an upper passageway 214 within the interior space thereof. The upper passageway extends from the rear 178 of the brake cable housing adjacent to aperture 51 towards the top 170 and front 184 of the brake cable housing. The upper passageway 214 is arc-shaped and downwardly concave in shape in this example. The upper passageway is shaped to receive excess portions 216 of the brake cable assembly 98 extending from the wheel-engaging brake member 205 and thus lower end 103 of cable 100 seen in FIG. 9.

As seen in FIG. 5, the brake cable housing 168 includes a lower passageway 218 within the interior space 200 thereof. The lower passageway extends through protrusion 182 of the brake cable housing 168 in this example towards the bottom 174 and front 184 of the brake cable housing. The lower passageway 218 is arc-shaped and upwardly concave in shape in this example. The lower passageway is shaped to receive excess portions 220 of brake cable assembly 98 extending from the gripping handle 130 as seen in FIG. 2 and thus extending from end 101 of cable 100.

Still referring to FIG. 5, each brake cable housing 168 includes a chamber 222 within the interior space 200 thereof. The brake cable housing encloses the chamber within the interior space. Chamber 222 is defined by and spans between peripheral edges 204 and 210 and sides 186 and 188 of the brake cable housing seen in FIG. 2 in this embodiment. The chamber is interposed between and in communication with the passageways 214 and 218. The upper and lower passageways may be referred to as openings in communication with the chamber. The cross-sectional widths of the upper passageway 214 and the lower passageway 218 taper so as to increase as the passageways extend from the height-adjustable assembly 34 towards the chamber 222. This is shown by width $W_1$ of passageway 218 adjacent to tube 42 being smaller than width $W_2$ of the passageway 218 adjacent chamber 222. The chamber is shaped to receive further excess portions 224 of brake cable assembly 98 coupled to and integrally formed with excess portions 216 and 220 thereof. The chamber 222 is concave in this example in a direction facing the upper passageway 214 and the lower passageway 218. The chamber is larger in volume and cross-section width $W_3$ compared to the upper passageway 214 and compared to the lower passageway 218. As seen in FIG. 5, the chamber 222 is c-shaped in this embodiment.

Slack portion 109 of brake cable assembly 98 abuts at least in part the inner peripheral edge 204 of the outer portion 202 of its corresponding brake cable housing 168 when the walker apparatus 20 is its retracted position in this example; however this is not strictly required. The slack portion of the brake cable assembly forms an enlarged loop in the retracted position of the walker apparatus. The slack portion 109 of the brake cable assembly 98 extends at least in part between the outer peripheral edge 210 of the inner portion 208 of brake cable housing 168 and inner peripheral edge 204 of outer portion 202 of the brake cable housing when the walker apparatus 20 is in an intermediate position between the retracted position seen in FIG. 3 and the extended position seen in FIG. 2. As seen in FIG. 2, slack portion 109 of brake cable assembly 98 in this example abuts the outer peripheral edge 210 of the inner portion 208 of its corresponding brake cable housing 168 when the walker apparatus 20 is its extended position; however this is not strictly required.

The slack portion of the brake cable assembly forms a loop of a smaller size in the extended position of the walker apparatus seen in FIG. 2 compared to the size of the loop seen in FIG. 4 when the walker apparatus is in its retracted position. When the apparatus is in its extended position the slack portion 109 of brake cable assembly 98 thus forms a reduced loop shape spanning a planar area that is less than that of the enlarged loop shape. The brake cable housing 168 is thus shaped to enclose the slack portion 109 of the brake cable assembly within the chamber 222 thereof. Referring to FIG. 2, the height-adjustable assemblies 34 and 36 and brake cable housings 168 may collectively be referred to as a macro adjustment mechanism for altering the length/portion of the brake cable assembly 98 extending within the height-adjustable assemblies.

Figure 6:
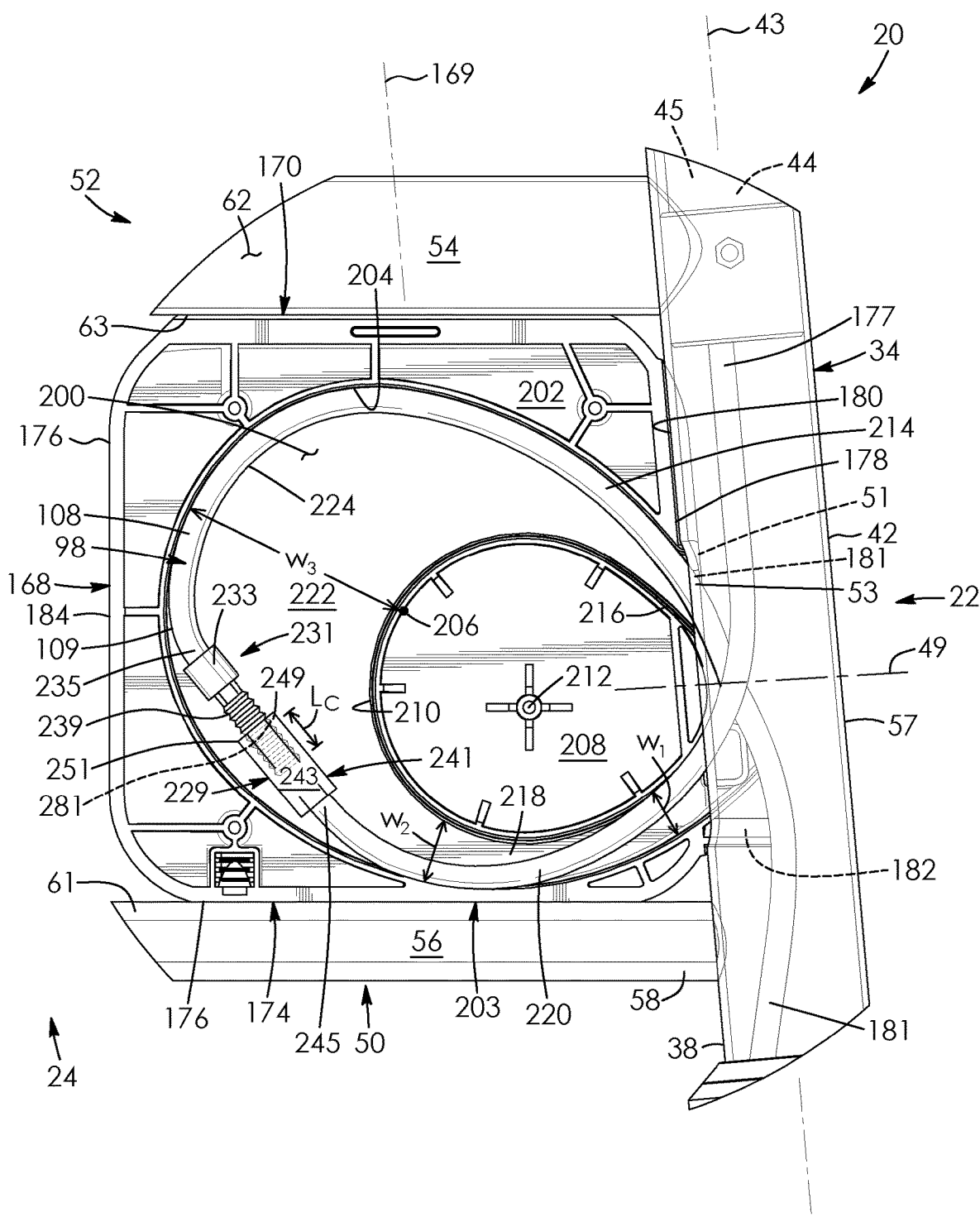
FIG. 6 is an inner side elevation view of the brake cable housing of FIG. 5, with the cable adjuster shown in an extended position, and the rest of the walker apparatus being shown in fragment and with transparent shading to reveal the interior components thereof.

Referring to FIG. 5, the walker apparatus 20 includes a cable adjuster 229 positioned within chamber 222 and enclosed by the brake cable housing 168. The cable adjuster may be referred to as a tension-adjustment knob. The brake cable housing is shaped to protect the cable adjuster. As seen in FIG. 6, the cable adjuster 229 comprises a first subassembly 231 including a first sleeve 233. The first sleeve is shaped to receive and couple to a distal or upper end 235 of a first or lower segment 181 of the cable sleeve 108 of the brake cable assembly 98. The first subassembly 231 includes a male member, in this example a threaded tube 239 with exterior threading thereon. The threaded tube couples to and extends outwards from the sleeve 233.

As seen in FIG. 4, the cable adjuster 229 comprises a second subassembly 241 including a second sleeve 243. The second sleeve is shaped to receive and couple to a proximal or lower end 245 of a second or upper segment 177 of the cable sleeve 108 of the brake cable assembly 98. As seen in FIG. 5, the cable adjuster 229 is inline with the cable sleeve of the brake cable assembly 98, and in this example inline with the slack portion 109 of the brake cable assembly. The cable adjuster couples together upper segment 177 and lower segment 181 of the cable sleeve 108 of the brake cable assembly 98. Cable 100 extends through the cable adjuster 229. One of the sleeves 233 and 243 of the cable adjuster 229 is rotatable relative to its corresponding segment of brake cable assembly 98, in this example sleeve 243.

The second subassembly 241 includes a female member, in this example a nut 249 coupled to, integrally formed with and extending outwards from the second sleeve 243. However, this is not strictly required: instead of being referred to as a nut, the second subassembly 241 may be said to comprise sleeve 243 having internal threading extending inwards from one end 251 thereof. The nut 249 threadably couples to and receives the threaded tube 239.

The cable adjuster 229 has a retracted position seen in FIGS. 4 and 5 in which the threaded tube 239 is fully inserted into and threadably coupled with the nut 249. Rotation of the nut relative to the threaded tube enables the cable adjuster to move from its retracted position seen in FIG. 5 to an extended position seen in FIG. 6. Only the distal end 281 of the threaded tube 239 threadably couples with and is inserted into the nut 249 when the cable adjuster is in its extended position in this example. Positioning of the upper segment 177 of the cable sleeve 108 of the brake cable assembly 98 relative to the lower segment 181 of the cable sleeve of the brake cable assembly may thus be adjusted to by a desired extension or length $L_C$. The cable sleeve of the brake cable assembly may therefore be selectively effectively lengthened by up to length $L_C$ via the cable adjuster 229. Threaded adjustment of the nut along and relative to the threaded tube alters the effective length of the cable sleeve 108 of the brake cable assembly 98. Actuation of the cable adjuster thus alters the effective length of the cable sleeve of the brake cable assembly and the cable adjuster may be said to comprise a micro adjustment mechanism for the brake cable assembly 98. Referring to FIGS. 5 and 9, the position of the end point of the cable relative to the brake pad 215 changes by actuating the cable adjuster 229 as spring 217 is continuously applying a pressure to the cable. Tension adjustment may thus occur via the inline nut.

As seen in FIG. 6, the slack portion 109 of the brake cable assembly 98 is configured to abut in part the peripheral edge 204 of the outer portion 202 of the brake cable housing 168 when the height-adjustable assembly 34 is in a retracted position and the cable adjuster 229 is in an extended position in this example. As seen in FIG. 2, the slack portion of the brake cable assembly is configured to abut in part the peripheral edge 210 of the inner portion of the brake cable housing when the height-adjustable assembly is in an extended position and the cable adjuster is in a retracted position.

Figure 14:
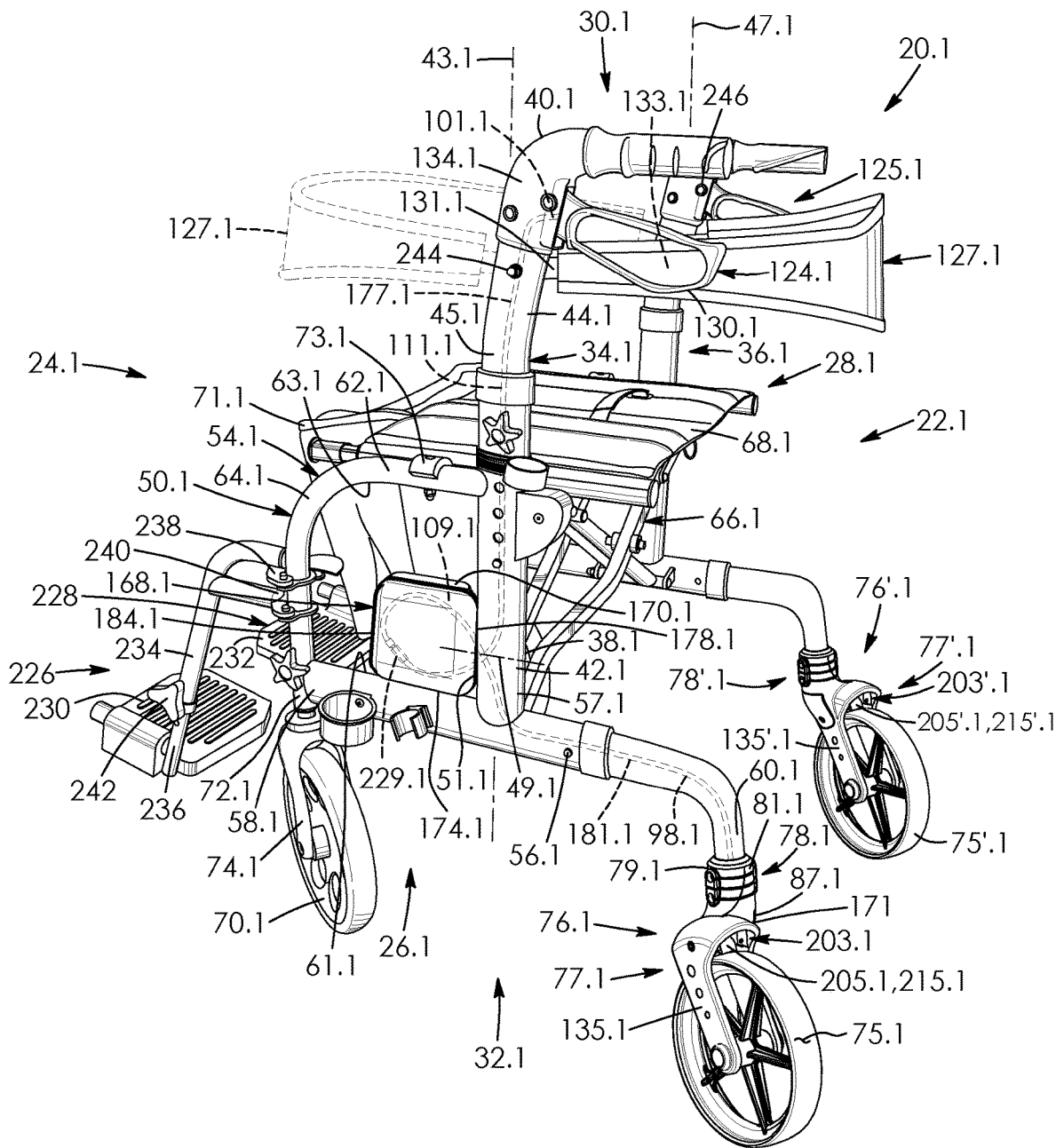
FIG. 14 is a right side, rear perspective view of a manually-operated, height-adjustable wheeled vehicle according to a second aspect, the vehicle comprising a combination transport chair and walker apparatus.

FIG. 14 shows a manually-operated, height-adjustable wheeled vehicle, in this example a combination transport chair and walker apparatus 20.1 according to a second embodiment. Like parts have like numbers and functionings as the embodiment shown in FIGS. 1 to 13 with the addition of "0.1". Apparatus 20.1 is substantially the same as apparatus 20 seen in FIGS. 1 to 13 with the following exceptions.

The apparatus 20.1 includes a pair of foot rest assemblies 226 and 228. The foot rest assemblies include foot rests 230 and 232 that are positioned along the front 24.1 and bottom 32.1 of the apparatus, with foot rest 230 being adjacent to side 26.1 and foot rest 232 being adjacent to side 28.1. The foot rests are planar and rectangular in shape in this example and are shaped to receive respective feet of a person who is sitting on seat assembly 68.1 while sitting facing the front of the apparatus 20.1.

Each of the foot rest assemblies 226 and 228 includes length-adjustable framing, in this example in the form of telescoping tubes 234 and 236. Outer tube 234 selectively couples to its respective laterally-extending assembly 50.1 via a coupling mechanism, in this example clamps 238 and 240 that extend about curved portion 64.1 of tube 54.1. Inner tube 236 couples to foot rest 230 and is received in part within the outer tube. Each of the foot rest assemblies 226 and 228 includes an adjustable mechanism, in this example a thumb screw 242. Loosening of the thumb screw enables inner tube 236 to be rotatable relative to outer tube 234 and enables the extent to which the inner tube extends outwards from the outer tube to be adjustable. When a desired length of tubing and angular position of the foot rests 230 is obtained, the thumb screw 242 is tightened to couple the inner and outer tubes together.

The apparatus 20.1 has a transportation chair mode shown with the backrest 127.1 in solid lines and in a transport-chair-mode position. The backrest in this position extends from its ends 131.1 and 133.1 towards the rear 22.1 of the apparatus. The backrest 127.1 includes a pair of adjustment mechanisms 244 and 246 adjacent to the ends 131.1 and 133.1 thereof. The adjustment mechanisms when loosened enable the backrest to move from the transport-chair-mode position to a walker-mode position seen by the positioning of the backrest in ghost lines. The backrest 127.1 in this position extends from its ends 131.1 and 133.1 towards the front 24.1 of the apparatus 20.1. When the desired backrest position is achieved, the thumb screws are tightened to inhibit rotation of the backrest relative to the height-adjustable assemblies 34.1 and 36.1 thereafter. Apparatus 20.1 thus can be a transportation chair at times and a walker apparatus at times. Thus, the apparatus can be configured as a transport chair or walker apparatus. Apparatus 20.1 is in part a transport chair may thus also be referred to as transport chair.

Lower side frame member, in this example tube 56.1 is J-shaped and has wheels 70.1 and 75.1 operatively connected thereto at distal ends 58.1 and 60.1 thereof. Upright assemblies 34.1 and 36.1 are positioned between the front 24.1 and the rear 22.1 of the apparatus 20.1 in this example. Tube 42.1 couples and extends upwards from tube 56.1. Tubes 42.1, 44.1 and 56.1 are similar in diameter in this example, with tubes 54.1 being smaller in diameter compared thereto.

Bottom 174.1 of brake cable housing 168.1 couples to and abuts top 61.1 of frame member 56.1 in this example. Elongate rear 178.1 of the brake cable housing couples to and abuts the outer tube 42.1 adjacent to frame member 56.1 in this case. Substantially straight portion 62.1 of tube 54.1 is spaced-apart above of the brake cable housing 168.1 in this example and curved portion 64.1 of the tube is positioned forward of the brake cable housing.

Figure 15:
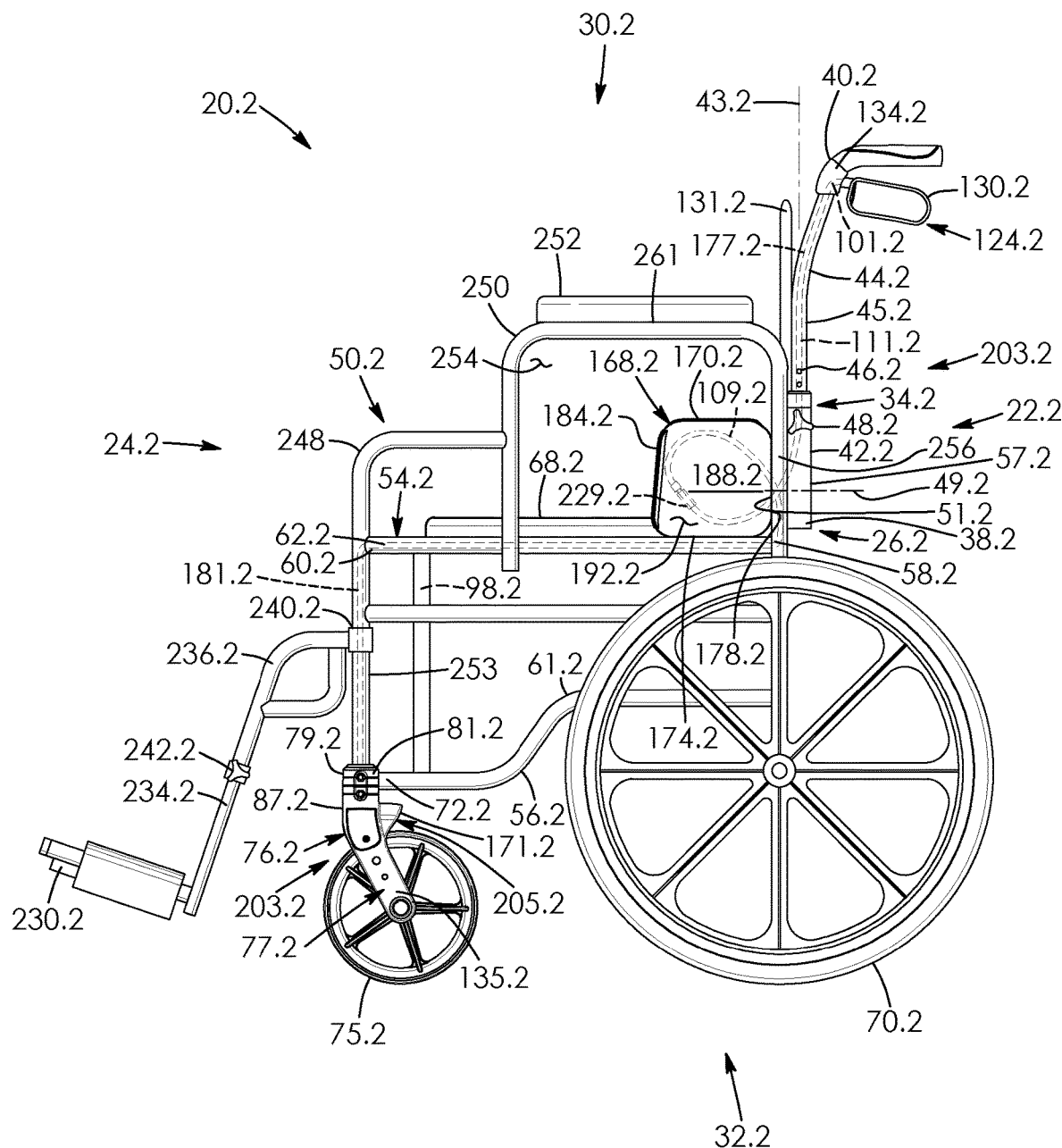
FIG. 15 is a right side elevation view of a manually-operated, height-adjustable wheeled vehicle according to a third aspect, the vehicle comprising a wheelchair.

FIG. 15 shows a manually-operated, height-adjustable wheeled vehicle, in this example a wheelchair 20.2 according to a third embodiment. Like parts have like numbers and functionings as the embodiment shown in FIGS. 1 to 13 with the addition of "0.2". Apparatus 20.2 is substantially the same as apparatus 20 seen in FIGS. 1 to 13 with the following exceptions.

The wheelchair has a pair of spaced-apart front wheels 75.2 to which brake assemblies 203.2 are coupled and a pair of spaced-apart, enlarged, hand-propelled rear wheel 70.2. The wheelchair 20.2 includes a pair of spaced-apart height-adjustable assemblies 34.2 to which corresponding gripping handles 130.2 pivotally couple at upper ends 40.2 of the height-adjustable assemblies.

The wheelchair includes various u-shaped frames 248 and 250 per laterally-extending assembly 50.2 in this example. Armrests 252 couple to and extend along the tops 261 of respective ones of frames 250. The frames 248 and 250 couple to and extend upwards from tube 54.2 in this example. The wheelchair 20.2 includes brake assemblies 203.2 for its front wheels 75.2, with a brake cable housing 168.2 per side thereof. Each brake cable housing is position within the square-shaped opening 254 formed by corresponding frame 250 and tube 54.2 in this example. Bottom 174.2 of the brake cable housing 168.2 couples to tube 54.2 and rear 178.2 of the brake cable housing couples to upright portion 256 of frame 250 in this example.

The wheelchair includes an upright backrest 131.2 which couples to the upright portion of frame 250 in this example. Tubes 42.2 of the height-adjustable assemblies 34.2 also couple to frame 250 in this example. The wheelchair 20.2 includes a vertically-extending hollow frame member, in this example tube 253 per side thereof, with the tube extending between tubes 54.2 and 56.2 in this example.

Brake cable assembly 98.2 is positioned within the framing of the wheelchair 20.2, in this example within tubes 44.2, 42.2, 54.2, and 253, with slack portion 109.2 of the brake cable assembly being enclosed within the brake cable housing 168.2 in a like manner as described previously. The brake cable housing is shaped to accommodate varying amounts of excess portions of the brake cable assembly as the vertical positioning of the gripping handles 130.2 is adjusted by the user as needed.

Figure 16:
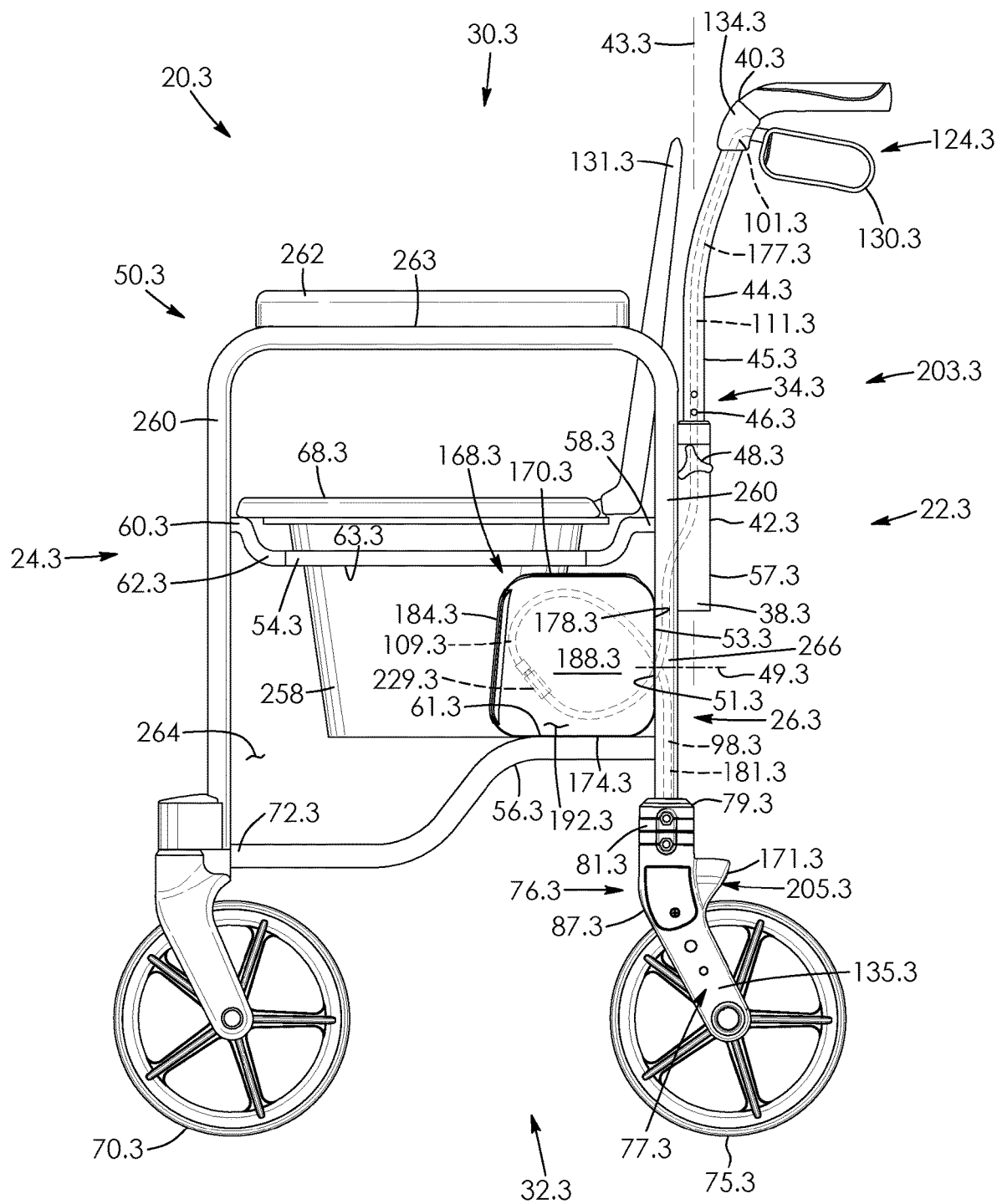
FIG. 16 is a right side elevation view of a manually-operated, height-adjustable wheeled vehicle according to a fourth aspect, the vehicle comprising a wheeled commode.

FIG. 16 shows a manually-operated, height-adjustable wheeled vehicle, in this example a wheeled commode, shown by number 20.3, according to a fourth embodiment. Like parts have like numbers and functionings as the embodiment shown in FIGS. 1 to 13 with the addition of "0.3". Apparatus 20.3 is substantially the same as apparatus 20 seen in FIGS. 1 to 13 with the following exceptions.

The commode has a pair of spaced-apart front wheels 70.3 and a pair of spaced-apart rear wheel 75.3. The commode 20.3 includes a pair of spaced-apart height-adjustable assemblies 34.3 to which gripping handles 130.3 pivotally couple at upper ends 40.3 of the height-adjustable assemblies. The commode includes a chamber pot 258 which couples to and extends downwards from seat 68.3 thereof. The commode includes an upright backrest 131.3 which couples to and extends upwards from the seat. The commode 20.3 includes a u-shaped frame 260 per laterally-extending assembly 50.3 in this example. Armrests 262 couple to and extend along the tops 263 of respective ones of the frames. Each frame 260 couples to and extends upwards from a respective tube 56.3. Tube 54.3 is positioned between tube 56.3 and top 263 of the frame in this example and couples to and extends between the frame.

The commode 20.3 includes brake assemblies 203.3 to selectively brake wheels 70.3 in this example. Each brake assembly includes a brake cable housing 168.3 positioned within the opening 264 formed by frame 260 and tubes 54.3 and 56.3 in this example. Bottom 174.3 of the brake cable housing couples to the top 61.3 of tube 56.3 in this example. Rear 178.3 of the brake cable housing 168.3 couples to upright portion 266 of frame 260 in this example. Tubes 42.3 of the height-adjustable assemblies 34.3 couple to the upright portions 266 of frames 260 in this example.

Brake cable assembly 98.3 is positioned within the framing of the commode 20.3, with tubes 42.3, 44.3 and 56.3 extending therearound. Slack portion 109.3 of the brake cable assembly is enclosed within the brake cable housing 168.3 in a like manner as described previously. The brake cable housing is shaped to accommodate varying amounts of excess portions of the brake cable assembly as the vertical positioning of the gripping handles 130.3 is adjusted by the user as needed. Actuation of gripping handle 130.3 causes the brake cable assembly 98.3 to 3 to selectively engage and the brake wheels 75.3. This functions to inhibit movement of the commode in a like manner as previous described above.

Figure 17:
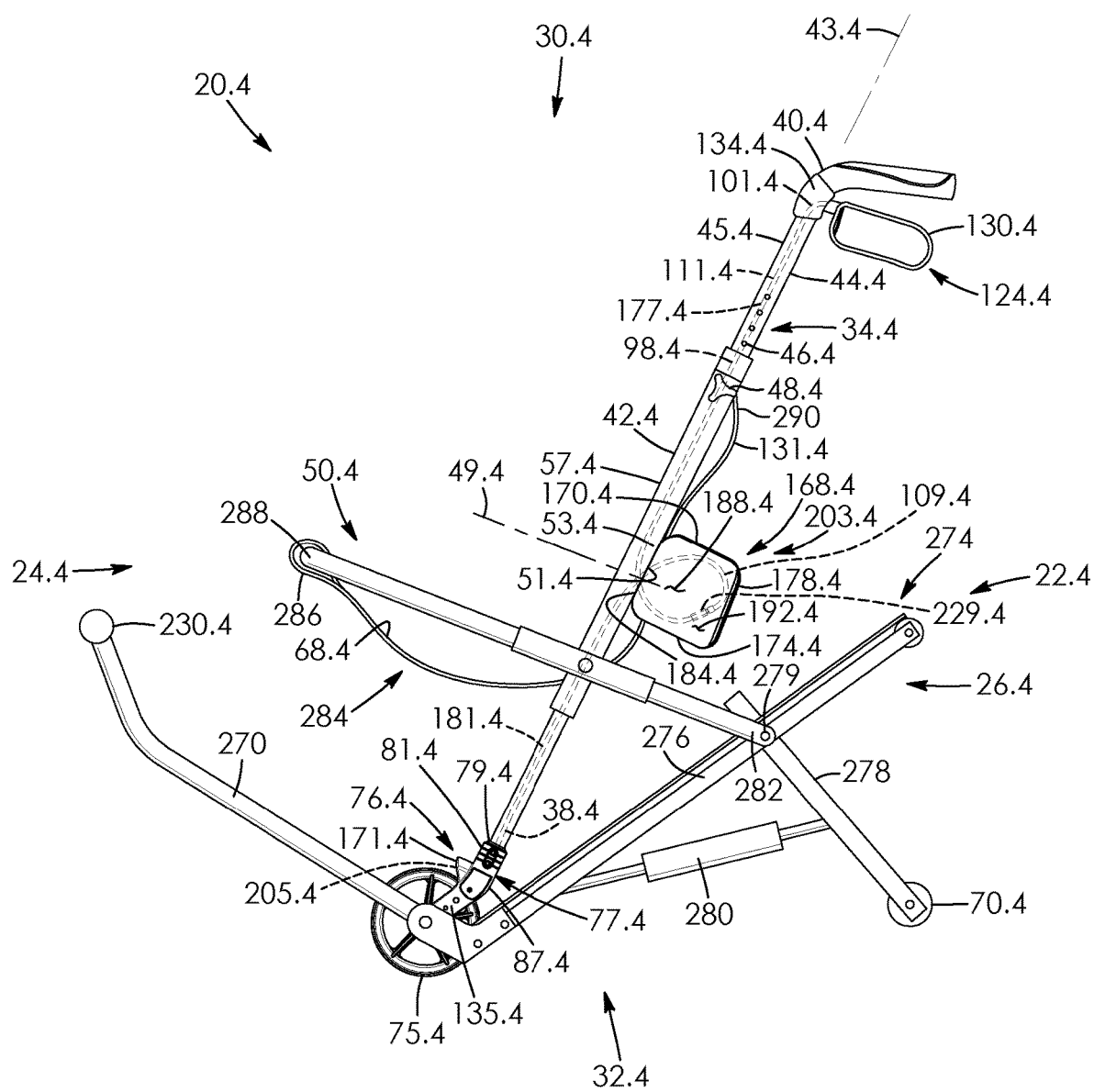
FIG. 17 is a right side elevation view of a manually-operated, height-adjustable wheeled vehicle according to a fifth aspect, the vehicle comprising an evacuation chair.

FIG. 17 shows a manually-operated, height-adjustable wheeled vehicle, in this example an evacuation chair 20.4 according to a fifth embodiment. Like parts have like numbers and functionings as the embodiment shown in FIGS. 1 to 13 with the addition of "0.4". Apparatus 20.4 is substantially the same as apparatus 20 seen in FIGS. 1 to 13 with the following exceptions.

The evacuation chair includes a pair of spaced-apart front wheels 75.4 and a pair of spaced-apart rear wheel 70.4. The evacuation chair 20.4 includes a pair of height/length-adjustable assemblies at adjacent sides thereof and to which respective laterally-extending assemblies pivotally connect. This is shown by height-adjustable assembly 34.4 pivotally connecting with laterally-extending assembly 50.4 between the lower end 38.4 and upper end 40.4 thereof. Front wheels 75.4 are rotatably mounted to the height-adjustable assemblies upright 34.4 adjacent to the lower ends thereof. A foot-support, in this example in the form of u-shaped frame 270, seen in side profile, pivotally couples to front wheels 75.4 and is extendable outwards from lower ends 38.4 of the height-adjustable assemblies upright 34.4.

The evacuation chair 20.4 includes a pair of wheel folding assemblies 274 per side thereof. Each folding assembly includes a pair of base frame members 276 and 278 that pivotally couple together via axle 279. Front wheels 75.4 rotatably couple to respective base frame members 276. Rear wheels 70.4 rotatably mount to base frame members 278. Each folding assembly includes in this example a hydraulic actuator 280 that pivotally connects to and couples together base frame member 278 and front wheel 75.4. Rear end 282 of laterally-extending assembly 50.4 pivotally couples to axle 279 in this example. The folding mechanisms, foot support, height-adjustable assemblies and laterally-extending assemblies of the evacuation chair 20.4 are configured to selectively fold upon themselves to form a compact form when the evacuation chair is not needed. Evacuation chairs per se, including their various parts and functionings, are well known to those skilled in the art and details regarding folding mechanisms in this regard will thus not be described in further detail.

The evacuation chair 20.4 includes a flexible member 284 with a bottom portion in the form of a seat 68.4 and an upright portion in the form of backrest 131.4. The flexible member extends between the sides 28.4 of the evacuation chair with a lower end 286 extending about and coupled to distal ends 288 of the laterally-extending assemblies 50.4 in this example. An upper end 290 of the flexible member 284 couples to the height-adjustable assemblies 34.4 at a location adjacent to thumb screw 48.4 in this example.

The evacuation chair 20.4 includes brake assemblies 203.4 with brake members 205.4 mounted to the height-adjustable assemblies 34.4 adjacent to the front wheels 70.4 of the evacuation chair. The brake assemblies include a brake cable housing 168.4 per side thereof. The front 184.4 of each brake cable housing couples to and extends along a respective tube 42.4 of its corresponding height-adjustable assembly 34.4 in this example.

Brake cable assembly 98.4 is positioned within the framing of the evacuation chair 20.4, in this example within tubes 44.4 and 42.4, with slack portion 109.4 of the brake cable assembly being enclosed within the brake cable housing 168.4 in a like manner as described previously. The brake cable housing is shaped to accommodate varying amounts of excess portions of the brake cable assembly as the positioning of the gripping handles 130.4 is adjusted by the user as needed. Actuation of the gripping handle causes the brake cable assembly 98.4 to move brake member 205.4 so as to selectively engage and brake front wheel 75.4. This functions to inhibit movement of the evacuation chair 20.4 in a like manner as previous described above.

Figure 18:
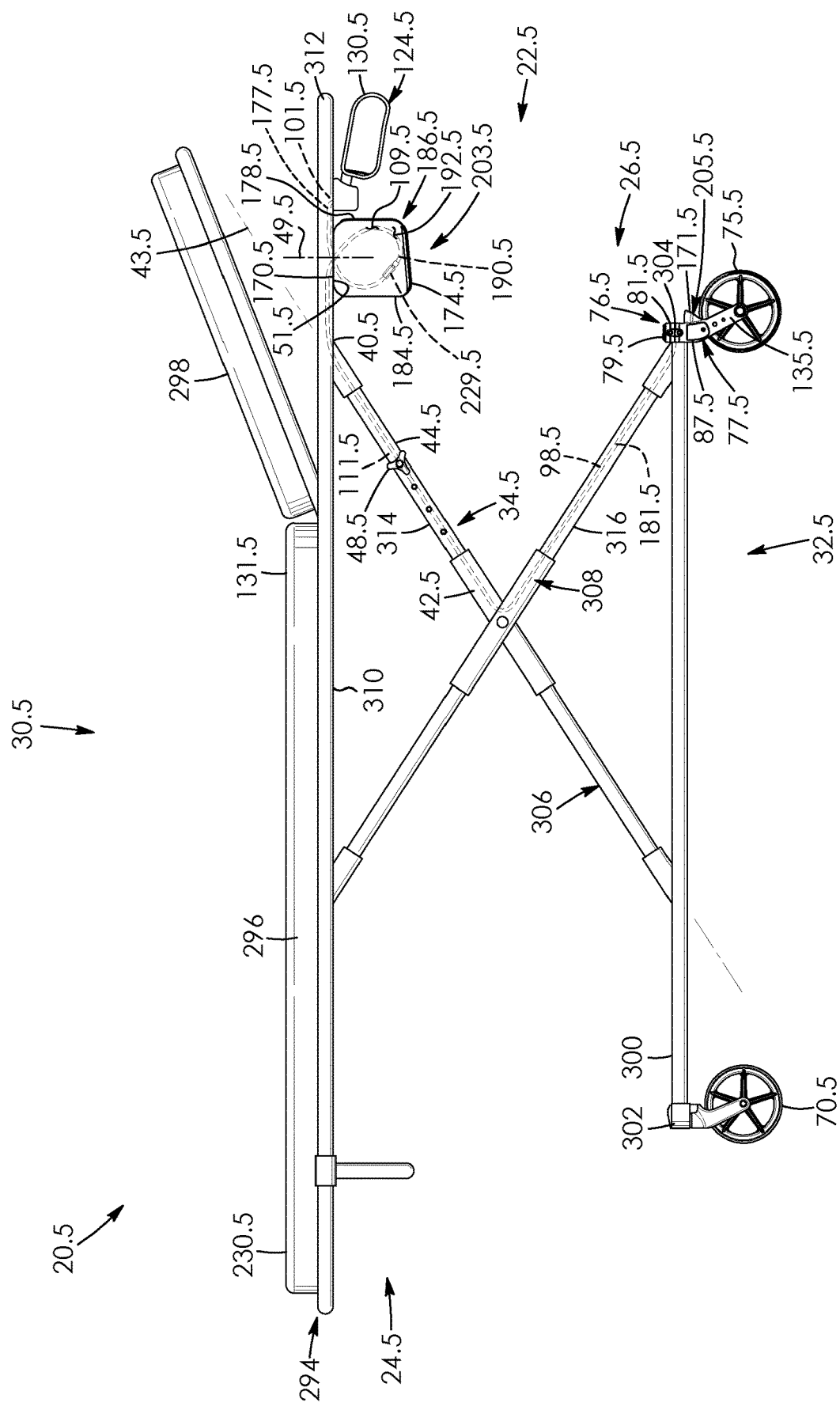
FIG. 18 is a right side elevation view of a manually-operated, height-adjustable wheeled vehicle according to a sixth aspect, the vehicle comprising a height-adjustable stretcher.

FIG. 18 shows a manually-operated, height-adjustable wheeled vehicle, in this example a height-adjustable stretcher 20.5 according to a sixth embodiment. Like parts have like numbers and functionings as the embodiment shown in FIGS. 1 to 13 with the addition of "0.5". Apparatus 20.5 is substantially the same as apparatus 20 seen in FIGS. 1 to 13 with the following exceptions.

The stretcher includes a horizontally-extending upper platform 294 upon a body mattress 296 and head cushion 298 couple and extend in this example. The stretcher 20.5 includes a base, in this example a base frame assembly 300 to which front wheels 70.5 rotatably mount at a forward end 302 thereof and to which rear wheels 75.5 mount at a rearward end 304 thereof. The stretcher includes a height-adjustment mechanism 34.5 which in this example comprises a pair of crossed-linking telescoping assemblies 306 and 308 that are hollow in this example. The telescoping assemblies pivotally couple to and extend between platform 294 and base frame assembly 300. Height-adjustment mechanisms for stretchers, including their various parts and functionings, are known per se and thus will not be described in further detail. The stretcher 20.5 includes a pair of gripping handles 130.5 that pivotally couple to the bottom 310 of platform 294 in this example adjacent to the rearward end 312 of the platform.

The stretcher includes brake assemblies 203.5 to selectively brake wheels 75.5 in this example. Each brake assembly includes a brake cable housing 168.5. In this example the top 170.5 of each brake cable housing couples to and extends along the bottom 310 of the platform 294 adjacent to the rearward end 312 of the platform.

Brake cable assembly 98.5 is positioned within the framing of the stretcher 20.5, in this example extending within platform 294, rearward tubing 314 telescoping assembly 306 and rearward tubing 316 of telescoping assembly 308; however this is not strictly required and the brake cable assembly may extend along the outside thereof in other embodiments. Slack portion 109.5 of the brake cable assembly is enclosed within the brake cable housing 168.5 in a like manner as described previously. The brake cable housing is shaped to accommodate varying amounts of excess portions of the brake cable assembly as the height of the stretcher is adjusted as needed. Actuation of gripping handle 130.5 causes the brake cable assembly 98.5 to move brake member 205.5 to selectively engage and brake rear wheels 70.5. This functions to inhibit movement of the stretcher in a like manner as previous described above.

Figure 19:
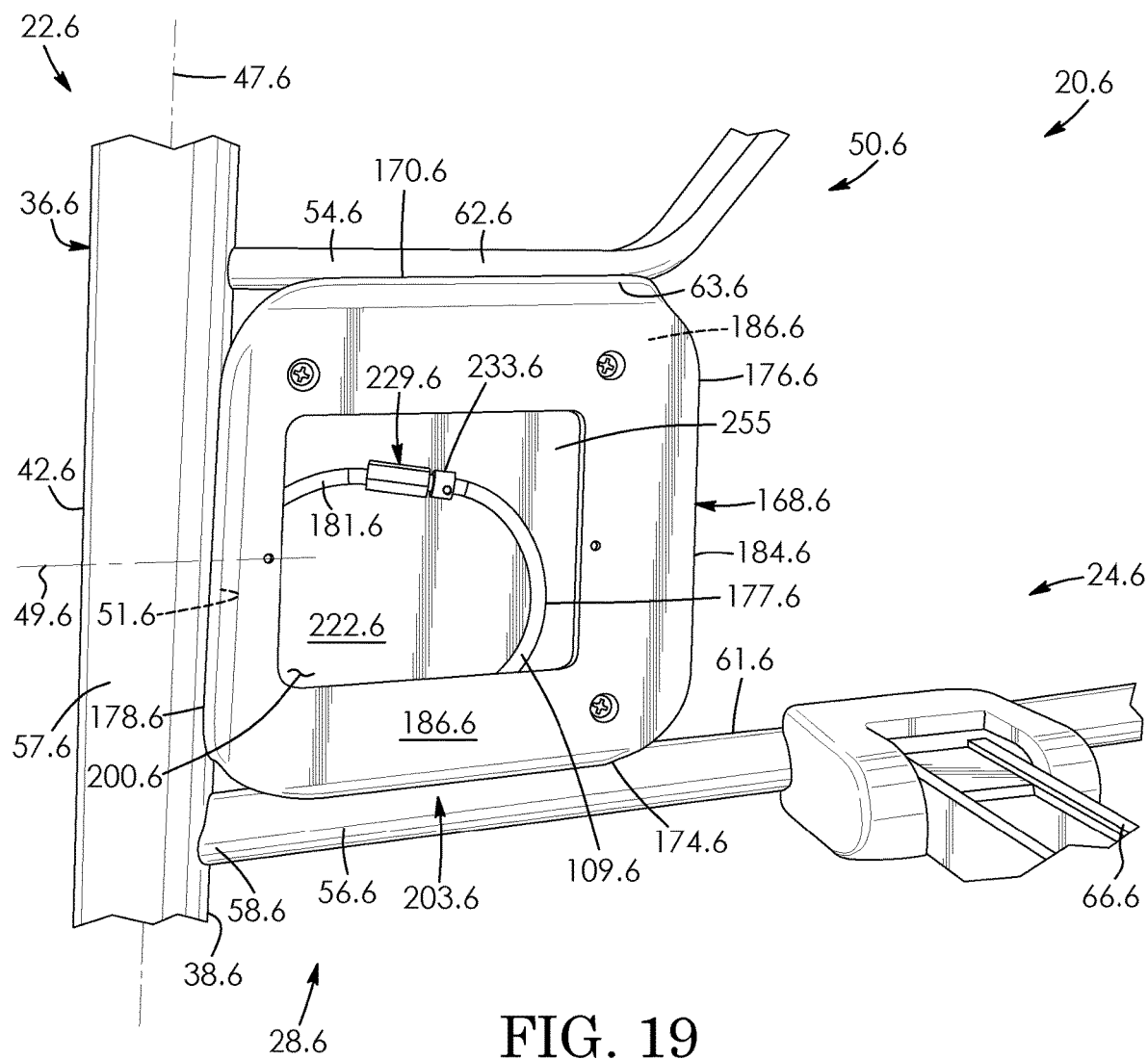
FIG. 19 is an inner side elevation view of a manually-operated, height-adjustable wheeled vehicle according to a seventh aspect, the vehicle comprising a walker apparatus similar to FIG. 1 with each brake cable housing thereof having an access port for selectively accessing a cable adjuster of the brake cable assembly thereof, and with the height-adjustable assembly, side framing and folding mechanism of the walker apparatus being shown in fragment.
Figure 20:
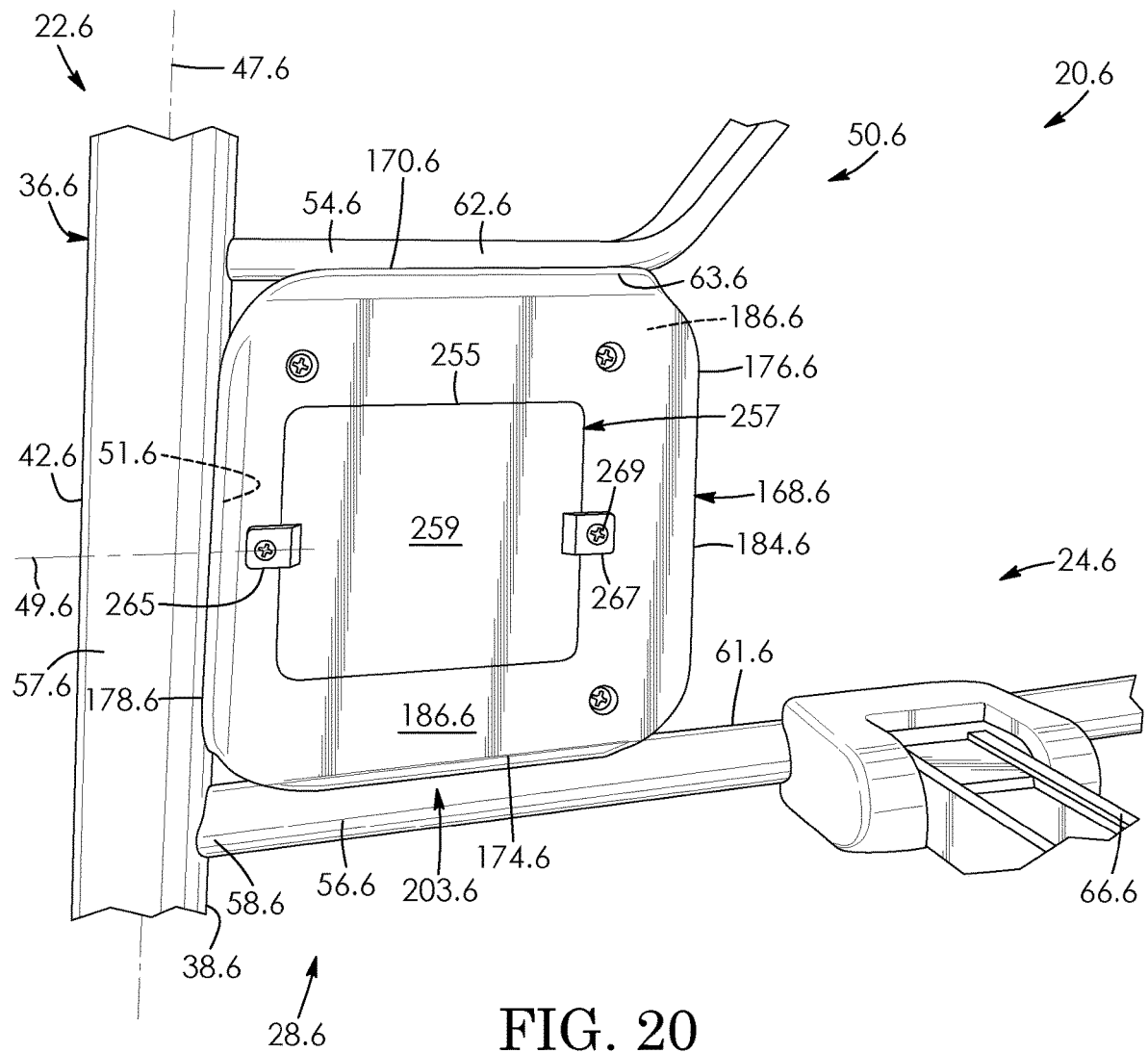
FIG. 20 is an inner side elevation view of the walker apparatus of FIG. 19, with a removable cover of the brake cable housing thereof shown extending across and covering the access port of FIG. 19, and with the height-adjustable assembly, side framing and folding mechanism of the walker apparatus being shown in fragment.
Figure 21:
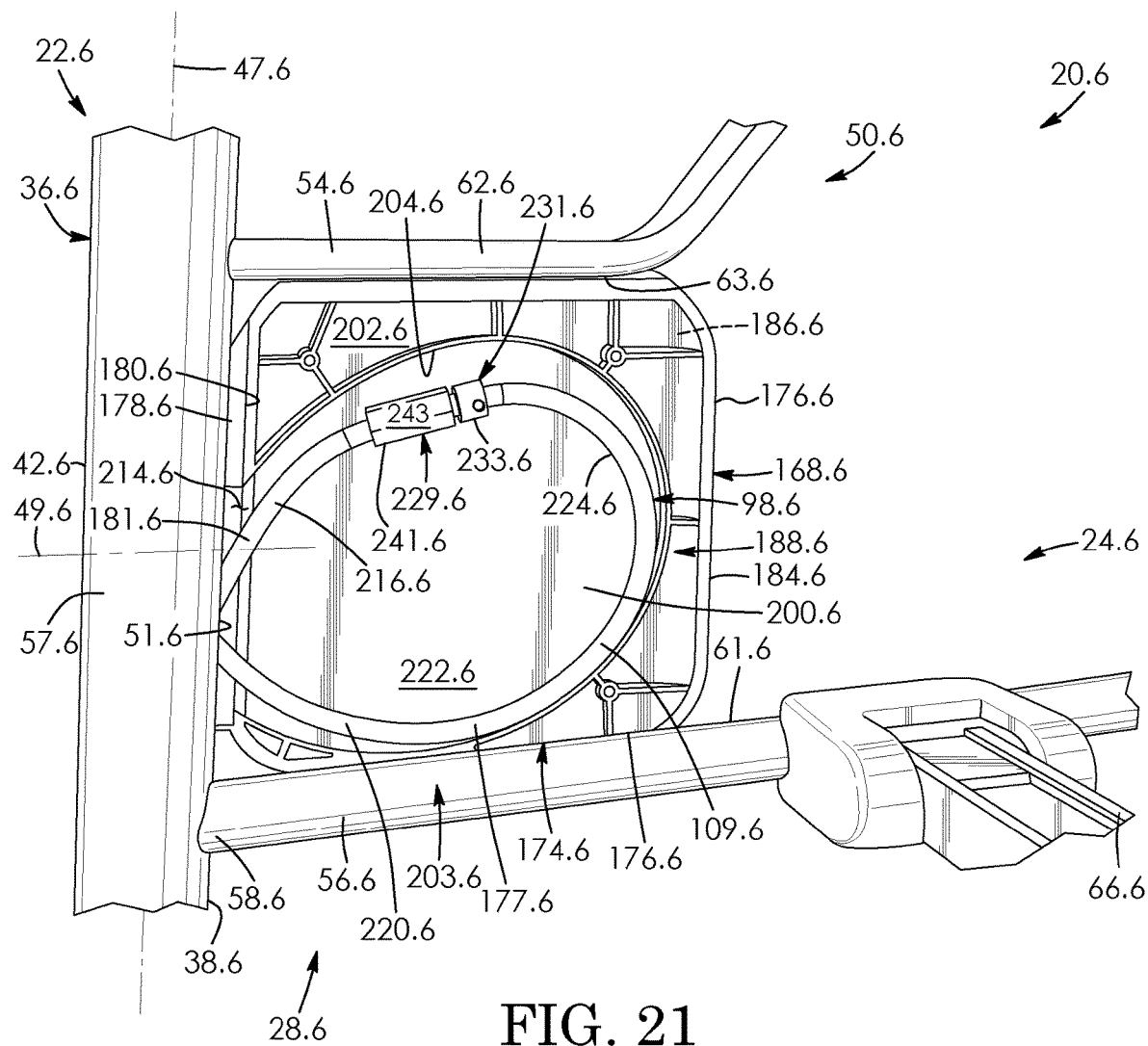
FIG. 21 is an inner side elevation view of the walker apparatus of FIG. 19, with the inner half of the brake cable housing thereof shown removed.

FIGS. 19 to 21 show a manually-operated, height-adjustable wheeled vehicle, in this example a walker apparatus 20.6 according to a seventh embodiment. Like parts have like numbers and functionings as the embodiment shown in FIGS. 1 to 13 with the addition of "0.6". Apparatus 20.6 is substantially the same as apparatus 20 seen in FIGS. 1 to 13 with the following exceptions.

As seen in FIG. 19, the brake cable housing 168.6 has an access port 255 extending through the inner side planar portion, in this example inner side 186.6 thereof. The access port is in communication with the chamber 222.6 and interior space 200.6 of the brake cable housing.

As seen in FIG. 20, the brake cable housing 168.6 includes a removable cover 257 which extends across the access port 255. The removable cover includes a planar portion 259 that is rectangular in this example. The removable cover 257 includes a pair of spaced-apart tabs 265 and 267 which are integrally formed with the planar portion thereof in this example. The tabs couple to and extend outwards from the planar portion 259. The removable cover 257 threadably couples to the inner side 186.6 of the brake cable housing 168.6 via fasteners, in this example screws 269 which extend through the tabs. The interior space 200.6 of the brake cable housing seen in FIG. 19 is thus accessible by selectively removing the cover seen in FIG. 20. As seen in FIG. 20, the peripheral portion 176.6 of the brake cable housing 168.6 is outwardly spaced from and extends about the removable cover 257. The removable cover is smaller in span compared to the inner side 186.6 of the brake cable housing 168.6 in this example.

As seen in FIG. 21, the brake cable housing 168.6 has a single opening or passageway 214.6 in this embodiment in communication with aperture 51.6. The excess or slack portion 109.6 of the brake cable assembly 98.6 extends into the chamber 222.6 via the passageway of the brake cable housing. The chamber is defined by and spans between inner wall or peripheral edge 204.6, which is arc-shaped, and the inner side 186.6 and outer side 188.6 of the brake cable housing 168.6 seen in FIG. 20. There is no inner portion or inner peripheral edge to the brake cable housing such as the inner portion 208 and peripheral edge 210 of brake cable housing 168 shown in FIG. 4. Referring back to FIG. 21, the slack portion 109.6 of the brake cable assembly 98.6 is thus movable anywhere within the chamber 222.6.

Figure 22:
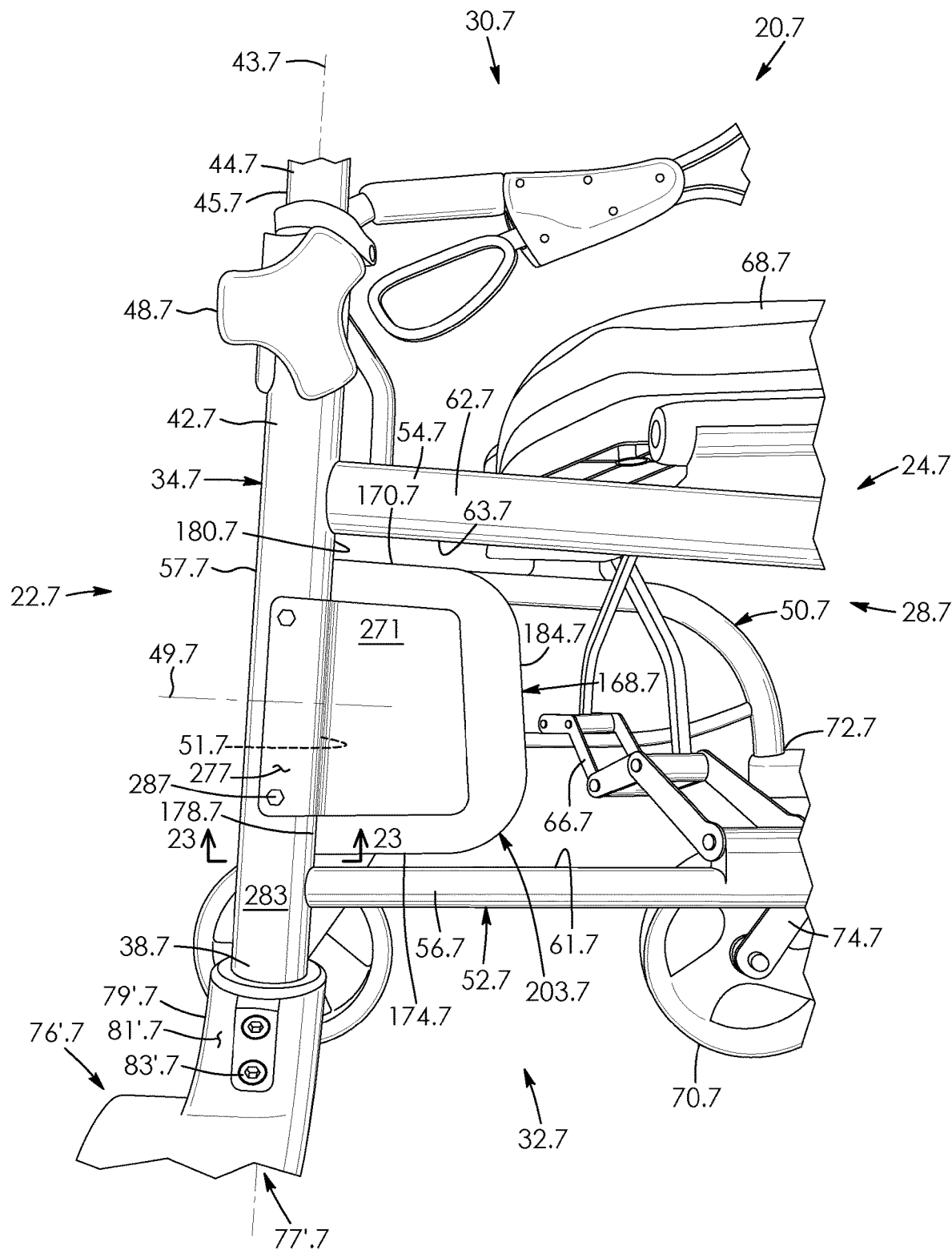
FIG. 22 is a left side elevation view of a manually-operated, height-adjustable wheeled vehicle according to an eighth aspect, the vehicle comprising a walker apparatus similar to FIG. 1, with the apparatus including connectors which couple the brake cable housings thereof to the height-adjustable assemblies thereof, and with the walker apparatus being shown partially in fragment.
Figure 23:
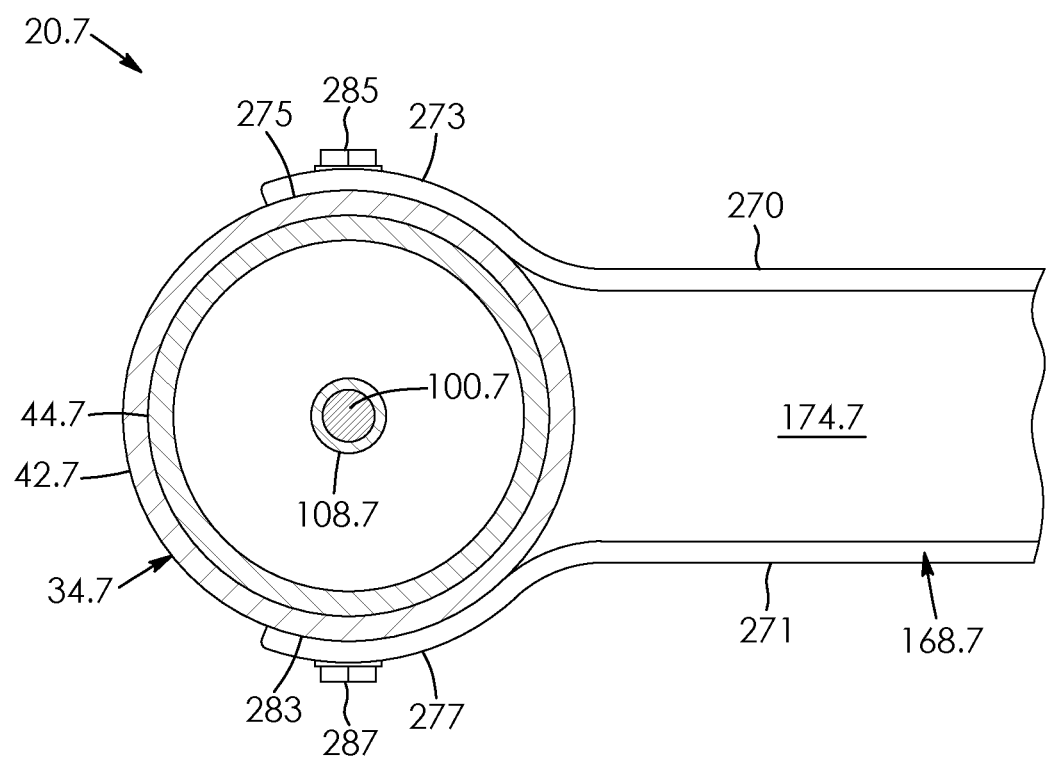
FIG. 23 is a sectional view taken along lines 23-23 of the walker apparatus of FIG. 22, showing the connectors thereof, the height-adjustable assembly thereof, and the brake cable assembly thereof, with the rest of the apparatus not being shown.

FIGS. 22 and 23 show a manually-operated, height-adjustable wheeled vehicle, in this example a walker apparatus 20.7 according to an eighth embodiment. Like parts have like numbers and functionings as the embodiment shown in FIGS. 1 to 13 with the addition of "0.7". Apparatus 20.7 is substantially the same as apparatus 20 seen in FIGS. 1 to 13 with the following exceptions.

As seen in FIG. 22, the brake cable housing 168.7 is spaced-apart from the one or more side frame members, in this example tubes 54.7 and 56.7 in this embodiment. The brake cable housing abuts front portion 180.7 of the height-adjustable assembly 34.7, in this example tube 42.7.

As seen in FIG. 23, the walker apparatus 20.7 includes at least one, and in this example a pair of connectors, in this example coupling members 270 and 271. Each coupling member is planar and rectangular in this example as seen by coupling member 271 in FIG. 22. The coupling members extend outwards from the rear 178.7 of the brake cable housing 168.7 in this example. As seen in FIG. 23, the coupling members 270 and 271 include arc-shaped portions 273 and 277 which couple to, receive in part and abut opposite side portions 275 and 283 of the height-adjustable assembly 34.7, in this example tube 42.7. The coupling members couple to the side portions of the height-adjustable assembly via fasteners, in this example screws 285 and 287.

Figure 24:
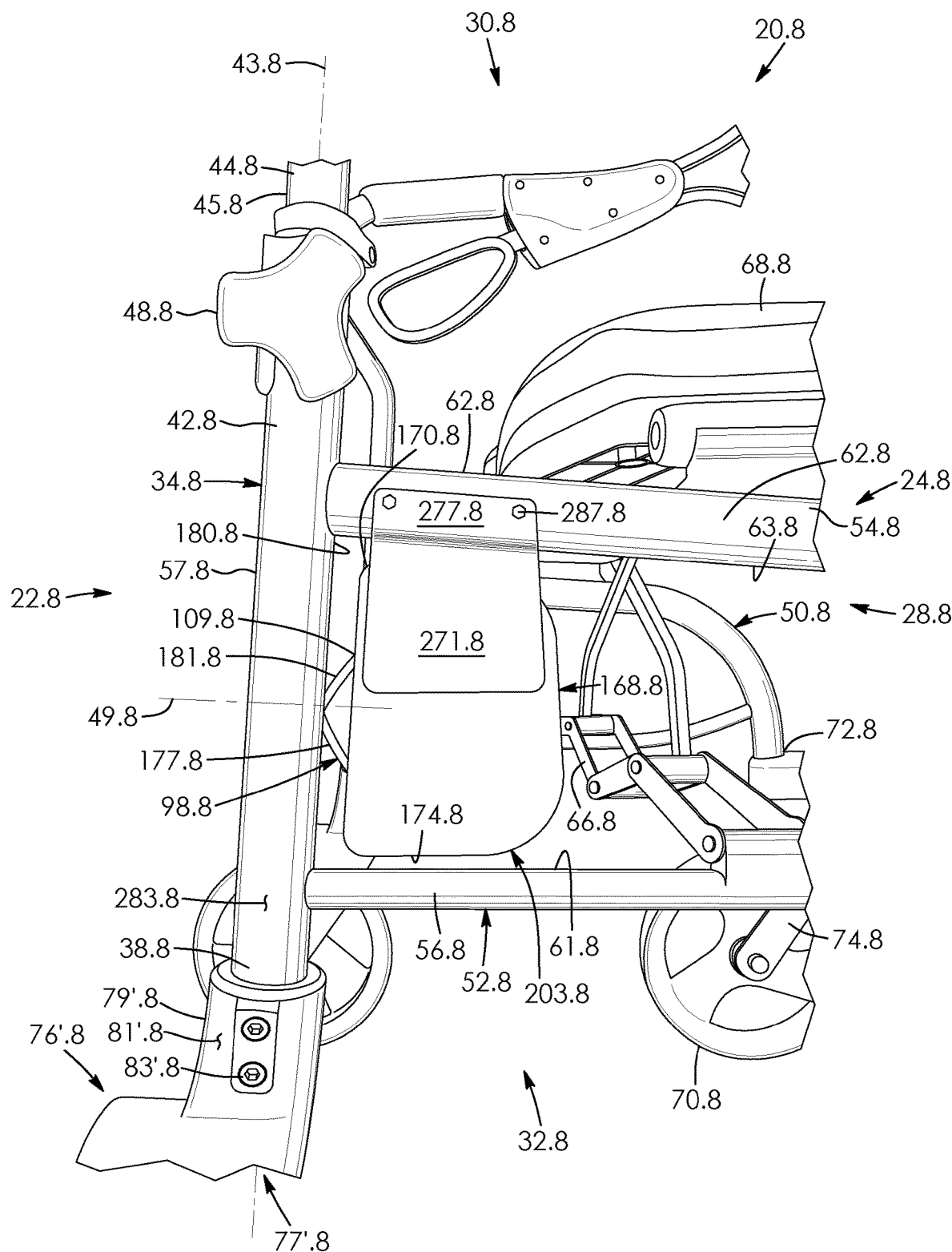
FIG. 24 is a left side elevation view of a manually-operated, height-adjustable wheeled vehicle according to a ninth aspect, the vehicle comprising a walker apparatus similar to FIG. 22, with the apparatus including connectors which couple the brake cable housings thereof to upper side frame members thereof, and with the walker apparatus being shown partially in fragment.

FIG. 24 shows a manually-operated, height-adjustable wheeled vehicle, in this example a walker apparatus 20.8 according to a ninth embodiment. Like parts have like numbers and functionings as the embodiment shown in FIGS. 22 to 23 with decimal extension "0.8" replacing decimal extension "0.7". Apparatus 20.8 is substantially the same as apparatus 20.7 seen in FIGS. 22 to 23 with the following exceptions.

Each brake cable housing 168.8 is spaced-apart from its height-adjustable assembly 34.8 and couples to its lateral-extending assembly 52.8. In this example, the top 170.8 of the brake cable housing 168.8 abuts the bottom 63.8 of the substantially-straight portion 62.8 of the upper side frame member, in this case tube 54.8. The brake cable housing couples to the tube via connector members 271.8. The coupling members extend outwards from the top 170.8 of the brake cable housing 168.8 in this example. Bottom 174.8 of the brake cable housing is spaced-apart above the lower side frame member, in this case tube 52.8.

Figure 25:
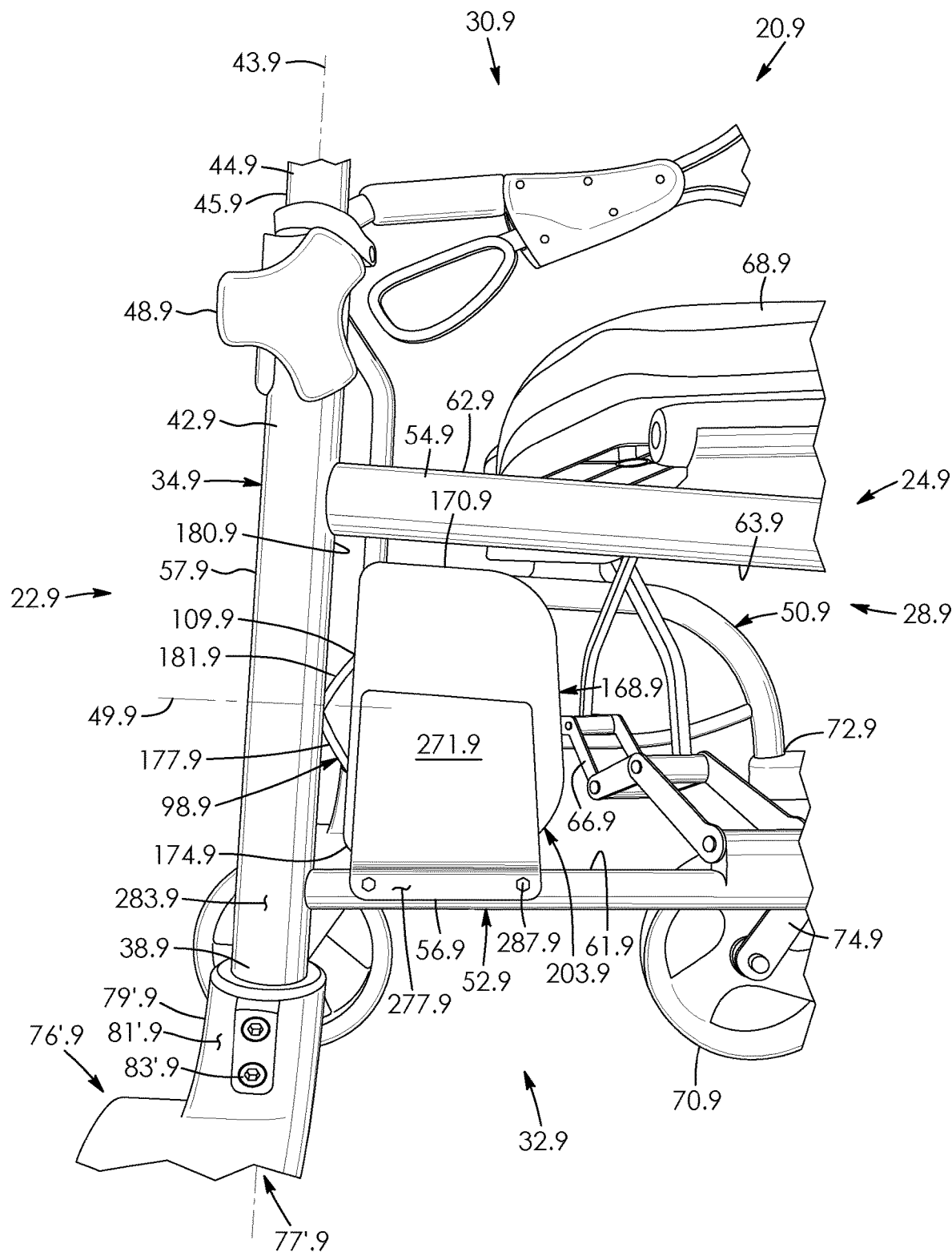
FIG. 25 is a left side elevation view of a manually-operated, height-adjustable wheeled vehicle according to a tenth aspect, the vehicle comprising a walker apparatus similar to FIG. 22, with the apparatus including connectors which couple the brake cable housings thereof to lower side frame members thereof, and with the walker apparatus being shown partially in fragment.

FIG. 25 shows a manually-operated, height-adjustable wheeled vehicle, in this example a walker apparatus 20.9 according to a tenth embodiment. Like parts have like numbers and functionings as the embodiment shown in FIG. 24 with decimal extension "0.9" replacing decimal extension "0.8". Apparatus 20.9 is substantially the same as apparatus 20.8 seen in FIG. 24 with the following exceptions.

Each brake cable housing 168.9 is spaced-apart from its height-adjustable assembly 34.9 and couples to its lateral-extending assembly 52.9, with bottom 174.9 of the brake cable housing abutting the top 61.9 of the lower side frame member, in this case tube 52.9. The brake cable housing couples to the tube via connector members 271.9. The coupling members extend downwards from the bottom 174.9 of the brake cable housing 168.9 in this example. Top 170.9 of the brake cable housing is spaced-apart below the upper side frame member, in this case tube 54.9.

Many advantages result from the structure of the present invention. For example, the cable adjuster is enclosed by the brake cable housing of the apparatus, thereby inhibiting inadvertent dislodgement thereof and functioning to protect the adjuster from wear and damage. The tension adjusting feature allows the brake cable tension to be selectively adjusted without needing to completely disassemble the braking system. The new fork structure allows a wider gait and greater tipping angle, thereby inhibiting tipping of the apparatus on its side when in use.

ADDITIONAL DESCRIPTION

Examples of manually-operated, height-adjustable wheeled vehicles, and brake assemblies and wheel fork assemblies therefor, have been described. The following clauses are offered as further description.

(1) A brake assembly for a manually-operated, height-adjustable wheeled vehicle, the brake assembly comprising: a brake cable assembly; a brake cable housing shaped to enclose an excess portion of the brake cable assembly; and a cable adjuster coupled to the brake cable assembly, the cable adjuster being enclosed by the brake cable housing.

(2) The brake assembly of clause 1, wherein the brake cable housing is shaped to protect the cable adjuster.

(3) The brake assembly of any one of clauses 1 to 2, the vehicle including a height-adjustable assembly, and wherein the brake cable assembly extends along the height-adjustable assembly.

(4) The brake assembly of any one of clauses 1 to 2, the vehicle including a height-adjustable assembly, and wherein the brake cable housing couples to the height-adjustable assembly.

(5) The brake assembly of any one of clauses 1 to 2, the vehicle including a height-adjustable assembly having a longitudinal axis, wherein the brake cable housing couples to the height-adjustable assembly, and wherein the brake cable housing extends laterally outwards relative to said longitudinal axis.

(6) The brake assembly of any one of clauses 3 to 5 wherein a first portion of the brake cable assembly extends along the height-adjustable assembly and a second portion of the brake cable assembly is enclosed within the brake cable housing.

(7) The brake assembly of clause 6 wherein the second portion of the brake cable assembly is loop-shaped.

(8) The brake assembly of any one of clauses 3 to 7, the vehicle including one or more side frame members which couple to and extend laterally outwards from the height-adjustable assembly, and wherein the brake cable housing is spaced-apart from the one or more side frame members.

(9) The brake assembly of any one of clauses 3 to 8 wherein the brake cable housing abuts a front portion of the height-adjustable assembly and is coupled to at least one side portion of the height-adjustable assembly.

(10) The brake assembly of any one of clauses 3 to 8 further including a planar member which couples the brake cable housing to a side portion of the height-adjustable assembly.

(11) The brake assembly of clause 10 wherein the planar member couples to and extends in part along an outer side of the brake cable housing.

(12) The brake assembly of any one of clauses 3 to 8 further including at least one connector extending outwards from the brake cable housing and which includes an arc-shaped portion which couples to and abuts a side portion of the height-adjustable assembly.

(13) The brake assembly of any one of clauses 3 to 12, wherein the brake cable housing includes an outer portion having an inner peripheral edge, and wherein the excess portion of the brake cable assembly is configured to abut in part the inner peripheral edge of the outer portion of the brake cable housing when the height-adjustable assembly is in a retracted position and the cable adjuster is in an extended position.

(14) The brake assembly of any one of clauses 3 to 13 wherein the brake cable housing includes an inner portion having an outer peripheral edge, and wherein the excess portion of the brake cable assembly is configured to abut in part the outer peripheral edge of the inner portion of the brake cable housing when the height-adjustable assembly is in an extended position and the cable adjuster is in a retracted position.

(15) The brake assembly of any one of clauses 1 to 12, wherein the cable adjuster has a retracted position and an extended position.

(16) The brake assembly of any one of clauses 1 to 15 wherein the brake cable assembly includes a cable and a cable sleeve extending about said cable, and wherein actuation the cable adjuster alters the effective length of the cable sleeve of the brake cable assembly.

(17) The brake assembly of any one of clauses 1 to 16 wherein the cable adjuster is inline with the brake cable assembly.

(18) The brake assembly of any one of clauses 6 to 7 wherein the cable adjuster is inline with the second portion of the brake cable assembly.

(19) The brake assembly of any one of clauses 1 to 15 wherein the cable adjuster includes a female member and a male member threadably coupled to and selectively adjustable relative to the female member.

(20) The brake assembly of clause 19 wherein the brake cable assembly includes a cable and a cable sleeve, wherein the female member and the male member are coupled to respective segments of the cable sleeve of the brake cable assembly and wherein one of the female member and the male member is rotatably coupled to its corresponding segment of the cable sleeve of the brake cable assembly.

(21) The brake assembly of any one of clauses 19 to 20 wherein the male member comprises a threaded tube and the female member comprises a threaded sleeve.

(22) The brake assembly of any one of clauses 1 to 15 wherein the brake cable assembly includes a cable and a cable sleeve extending about the cable, wherein the cable adjuster includes a first subassembly comprising a first sleeve shaped to receive and couple to an end of a first segment of the cable sleeve of said brake cable assembly, the first subassembly further comprising a threaded tube coupled to and extending outwards from the first sleeve, and wherein the cable adjuster includes a second subassembly comprising a second sleeve shaped to receive and couple to an end of a second segment of the cable sleeve of said brake cable assembly, the second subassembly further comprising a nut coupled to and extending outwards from said second sleeve, the nut threadably coupling to said threaded tube, with threaded adjustment of the nut relative to the threaded tube altering the effective length of the cable sleeve of the brake cable assembly.

(23) The brake assembly of clause 22 wherein the nut is integrally connected to and formed with the second sleeve.

(24) The brake assembly of any one of clauses 1 to 23 wherein the brake cable housing has an interior and includes a removable cover via which said interior is accessible.

(25) The brake assembly of any one of clauses 1 to 24, further including a wheel-engaging brake member, wherein actuation of the cable adjuster alters positioning of the wheel-engaging brake member relative to a wheel.

(26) The brake assembly of any one of clauses 1 to 24, further including a wheel-engaging brake member, wherein actuation of the cable adjuster alters positioning of an end point of the brake cable assembly relative to the wheel-engaging brake member.

(27) The brake assembly of any one of clauses 1 to 26, further including a resilient member which continuously applies a pressure to the brake cable assembly.

(28) A brake assembly for a manually-operated, height-adjustable wheeled vehicle, the vehicle including a height-adjustable assembly, and the brake assembly comprising: a brake cable housing coupled to and extending laterally outwards from the height-adjustable assembly, the brake cable housing enclosing a chamber and having an opening in communication with said chamber; and a brake cable assembly including a first portion extending along the height-adjustable assembly and a second portion enclosed within the brake cable housing, the second portion of the brake cable assembly extending into the chamber via said opening and being movable anywhere within said chamber.

(29) A brake assembly for a manually-operated, height-adjustable wheeled vehicle, the vehicle including a height-adjustable assembly, and the brake assembly comprising: a brake cable assembly extending along the height-adjustable assembly; and a brake cable housing shaped to enclose an excess portion of the brake cable assembly within a chamber thereof, the brake cable housing having an access port extending through an inner side planar portion thereof, the access port being in communication with said chamber.

(30) The brake assembly of clause 29, further including a removable cover which extends across said access port.

(31) The brake assembly of any one of clauses 29 to 30, wherein the removable cover is smaller than the inner side planar portion of the brake cable housing.

(32) The brake assembly of clause 31 wherein the brake cable housing includes a peripheral portion which extends about the inner side planar portion thereof and a top, a bottom, a front and a rear thereof, the peripheral portion of the brake cable housing being outwardly spaced from and extending about the removable cover.

(33) The brake assembly of any one of clauses 29 to 32, wherein the brake cable housing includes an outer side planar portion, wherein the brake cable housing includes an arc-shaped wall extending between said side planar portions, and wherein the chamber is defined by and spans between said side planar portions and said arc-shape wall.

(34) A walker comprising the brake assembly of any one of clauses 1 to 33.

(35) A rollator comprising the brake assembly of any one of clauses 1 to 33.

(36) A transport chair comprising the brake assembly of any one of clauses 1 to 33.

(37) A combination transport chair and walker apparatus comprising the brake assembly of any one of clauses 1 to 33.

(38) A wheelchair comprising the brake assembly of any one of clauses 1 to 33.

(39) A wheeled commode comprising the brake assembly of any one of clauses 1 to 33.

(40) An evacuation chair comprising the brake assembly of any one of clauses 1 to 33.

(41) A height-adjustable stretcher comprising the brake assembly of any one of clauses 1 to 33.

(42) A wheel fork assembly for a manually-operated, height-adjustable wheeled vehicle, the vehicle including a frame member, and the wheel fork assembly comprising: a mount shaped to couple with a lower end of the frame member, the mount having a longitudinal axis; and a wheel fork having a longitudinal axis offset from the longitudinal axis of the mount and being integrally coupled to and formed with said mount.

(43) The wheel fork assembly of clause 42 wherein an inner planar portion of the wheel fork aligns with the longitudinal axis of the mount.

(44) The wheel fork assembly of any one of clauses 42 to 43, wherein the mount is tubular at least in part.

(45) A wheel fork assembly for a manually-operated, height-adjustable wheeled vehicle, the vehicle including a frame member, and the wheel fork assembly comprising: a mount including an upper portion shaped to couple with a lower end of the frame member and a lower portion that curves laterally outwards; and a wheel fork coupled to the lower portion of the mount.

(46) The wheel fork assembly of any one of clauses 42 to 45, wherein the wheel fork assembly has outer and inner sides, and wherein each said side of the wheel fork assembly is outwardly concave in part and outwardly convex in part.

(47) The wheel fork assembly of clause 45 wherein the mount has an outer side and an inner side, with the lower portion of the mount being outwardly concave at said outer side of the mount and being outwardly convex at said inner side of the mount.

(48) The wheel fork assembly of any one of clauses 45 to 47, wherein the upper portion of the mount is tubular.

(49) The wheel fork assembly of any one of clauses 45 to 47, wherein the wheel fork is shaped to receive a wheel therebetween such that the wheel is forward facing and laterally outwardly spaced from the frame member of the vehicle.

(50) A wheel fork assembly for a manually-operated, height-adjustable wheeled vehicle, the wheel fork assembly comprising: a pair of elongate supports having lower portions between which a wheel is mountable and having upper portions, an aperture extending through the upper portion of one said elongate support; an upper cover which couples together the upper portions of the elongate supports; and a side cover that extends across said aperture and which is selectively removable.

(51) The wheel fork assembly of clause 50, the vehicle including a wheel-engaging brake member and a brake adjustment mechanism, wherein the upper cover and the upper portions of the elongate supports extend about the wheel-engaging brake member and the brake adjustment mechanism, wherein the aperture is in communication with the brake adjustment mechanism, and wherein selective removable of the side cover provides access to the brake adjustment mechanism.

(52) The wheel fork assembly of any one of clauses 50 to 51 wherein the upper portion of the one said elongate support includes a pair of flanges between which said aperture extends.

(53) The wheel fork assembly of any one of clauses 50 to 52, further including a fastener, the side cover coupling to the one said elongate support via said fastener.

(54) A wheel fork assembly for a manually-operated, height-adjustable wheeled vehicle, the vehicle including a wheel-engaging brake member and a brake adjustment mechanism, and the wheel fork assembly comprising: a pair of elongate supports between which a wheel is received and to which the wheel rotatably couples; and a housing which couples together the elongate supports and extends about the wheel-engaging brake member and the brake adjustment mechanism, the housing including a side cover with removal thereof providing access to the brake adjustment mechanism, the side cover aligning with one of said elongate supports.

(55) The wheel fork assembly of any one of clauses 50 to 54, wherein the wheel fork assembly has an inner side and the side cover extends along said inner side.

(56) The wheel fork assembly of any one of clauses 50 to 54, wherein the side cover is outwardly-curved at least in part.

(57) The wheel fork assembly of any one of clauses 50 to 56, wherein the side cover is outwardly-convex at least in part.

(58) A wheel fork assembly for a manually-operated, height-adjustable wheeled vehicle, the vehicle including a wheel-engaging brake member and a brake adjustment mechanism, and the wheel fork assembly comprising: a pair of elongate supports between which a wheel is received and to which the wheel rotatably couples; and a housing which couples together the elongate supports and extends about the wheel-engaging brake member and the brake adjustment mechanism, the housing including a cover with removal thereof providing access to the brake adjustment mechanism, the cover aligning with an inner side of the wheel fork assembly.

(59) A walker comprising the wheel fork assembly of any one of clauses 42 to 58.

(60) A rollator comprising the wheel fork assembly of any one of clauses 42 to 58.

(61) A transport chair comprising the wheel fork assembly of any one of clauses 42 to 58.

(62) A combination transport chair and walker apparatus comprising the wheel fork assembly of any one of clauses 42 to 58.

(63) A wheelchair comprising the wheel fork assembly of any one of clauses 42 to 58.

(64) A wheeled commode comprising the wheel fork assembly of any one of clauses 42 to 58.

(65) An evacuation chair comprising the wheel fork assembly of any one of clauses 42 to 58.

(66) A height-adjustable stretcher comprising the wheel fork assembly of any one of clauses 42 to 58.

(67) A manually-operated, height-adjustable wheeled vehicle comprising: a height-adjustable assembly having a longitudinal axis; a side frame member coupled to the height-adjustable assembly, the side frame member extending outwards from the height-adjustable assembly relative to the longitudinal axis of the height-adjustable assembly; a brake cable having an elongate portion and a slack portion; and a brake cable housing axially offset from the height-adjustable assembly, the slack portion of the brake cable being enclosed within a hollow interior of the brake cable housing, and the brake cable housing coupling to said side frame member.

(68) The vehicle of clause 67 wherein the brake cable housing is spaced-apart from said height-adjustable assembly.

(69) The vehicle of any one of clauses 67 to 68 further including a connector extending outwards from the brake cable housing, the connector including an arc-shaped portion which couples to and abuts a side portion of the height-adjustable assembly.

It will be appreciated that many variations are possible within the scope of the invention described herein. For example, while manually-operated vehicles have been described, in this case in the form of a walker apparatus, a rollator, a transport chair, a combination transport chair and walker apparatus, a wheelchair, a wheeled commode, an evacuation chair and a height-adjustable stretcher, the brake assemblies and wheel fork assemblies described herein may apply to vehicles of this nature which are motorized at least in part as well to other vehicles, for example.

It will also be understood by someone skilled in the art that many of the details provided above are by way of example only and are not intended to limit the scope of the invention which is to be determined with reference to the following claims.

What is claimed is:

1. A brake assembly for a manually-operated, height-adjustable wheeled vehicle, the brake assembly comprising:
   a brake cable assembly;
   a brake cable housing shaped to enclose an excess portion of the brake cable assembly, the brake cable housing including an access port via which the excess portion of the brake cable assembly is selectively accessible, and wherein the brake cable housing includes inner and outer side planar portions, wherein the brake cable housing includes an arc-shaped wall extending between said side planar portions, and wherein the brake cable housing includes a chamber via which the excess portion of the brake cable assembly extends, the chamber being defined by and spanning between said side planar portions and said arc-shaped wall; and
   a cable adjuster coupled to the excess portion of the brake cable assembly, the cable adjuster being enclosed by and uncoupled from the brake cable housing.

2. The brake assembly as claimed in claim 1, wherein the brake cable housing is shaped to protect the cable adjuster.

3. The brake assembly as claimed in claim 1 wherein the brake cable assembly includes a cable and a cable sleeve extending about said cable, and wherein actuation of the cable adjuster alters an effective length of the cable sleeve of the brake cable assembly.

4. The brake assembly as claimed in claim 1 wherein the cable adjuster is inline with the excess portion of the brake cable assembly.

5. The brake assembly as claimed in claim 1 wherein the cable adjuster includes a female member and a male member threadably coupled to and selectively adjustable relative to the female member.

6. The brake assembly as claimed in claim 5 wherein the brake cable assembly includes a cable and a cable sleeve, wherein the female member and the male member are coupled to respective segments of the cable sleeve of the brake cable assembly and wherein one of the female member and the male member is rotatably coupled to its corresponding segment of the cable sleeve of the brake cable assembly.

7. The brake assembly as claimed in claim 5 wherein the male member comprises a threaded tube and the female member comprises a threaded sleeve.

8. The brake assembly as claimed in claim 1 wherein the brake cable housing includes a removable cover via which the cable adjuster is selectively accessible.

9. The brake assembly as claimed in claim 1, wherein the brake assembly further includes a wheel-engaging brake member, and wherein actuation of the cable adjuster alters positioning of the wheel-engaging brake member relative to a wheel.

10. The brake assembly as claimed in claim 1, further including a resilient member biased against the brake cable assembly.

11. A manually-operated, height-adjustable vehicle comprising the brake assembly as claimed in claim 1, the vehicle being one of a walker apparatus, a rollator, a transport chair, a combination transport chair and walker apparatus, a wheelchair, a wheeled commode, an evacuation chair and a height-adjustable stretcher.

12. The brake assembly as claimed in claim 1, wherein the brake cable housing has an inner side planar portion and wherein the access port extends through said inner side planar portion of the brake cable housing.

13. The brake assembly as claimed in claim 1, wherein the brake cable housing encloses a chamber and has an opening in communication with said chamber, and wherein the excess portion of the brake cable assembly extends into the chamber via said opening and is movable anywhere within said chamber.

14. The brake assembly as claimed in claim 1, further including a removable cover which extends across said access port.

15. The brake assembly as claimed in claim 14, wherein the brake cable housing has an inner side planar portion and wherein the removable cover is smaller than the inner side planar portion of the brake cable housing.

16. The brake assembly as claimed in claim 15, wherein the brake cable housing has a top, a bottom, a front, and a rear, wherein the brake cable housing includes a peripheral portion which extends about the inner side planar portion thereof, the top thereof, the bottom thereof, the front thereof and the rear thereof, and wherein the peripheral portion of the brake cable housing is outwardly spaced from and extends about the removable cover.

17. The brake assembly as claimed in claim 1 wherein the cable adjuster of the brake cable assembly is selectively accessible via the access port of the brake cable housing.

18. A manually-operated, height-adjustable vehicle comprising the brake assembly as claimed in claim 1, the vehicle being one of a walker apparatus, a rollator, a transport chair, a combination transport chair and walker apparatus, a wheelchair, a wheeled commode, an evacuation chair and a height-adjustable stretcher.

* * * * *